(12) United States Patent
Takami et al.

(10) Patent No.: US 7,596,601 B2
(45) Date of Patent: Sep. 29, 2009

(54) MOBILE COMMUNICATION TERMINAL, DETECTION CONDITION DISTRIBUTION SERVER AND DETECTED MAIL NOTIFICATION RECEIVING SERVER

(75) Inventors: Tadao Takami, Yokosuka (JP); Yasutaka Urakawa, Yokohama (JP); Hisakazu Kojima, Yokosuka (JP); Kenji Ishii, Yokohama (JP); Masanori Fujita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 835 days.

(21) Appl. No.: 10/647,239

(22) Filed: Aug. 26, 2003

(65) Prior Publication Data
US 2004/0102185 A1 May 27, 2004

(30) Foreign Application Priority Data
Aug. 26, 2002 (JP) .......................... P2002-245598

(51) Int. Cl.
*G06F 15/16* (2006.01)
*H04M 3/42* (2006.01)
*H04M 1/725* (2006.01)

(52) U.S. Cl. .................. 709/206; 455/414.1; 455/412.2

(58) Field of Classification Search ................ 709/206; 455/412.1, 412.2, 414.1, 461
See application file for complete search history.

(56) References Cited

U.S. PATENT DOCUMENTS

| | | | |
|---|---|---|---|
| 6,052,709 A | * | 4/2000 | Paul ............................ 709/202 |
| 6,421,709 B1 | | 7/2002 | McCormick et al. |
| 2001/0038625 A1 | * | 11/2001 | Satoh ........................... 370/352 |
| 2002/0091569 A1 | * | 7/2002 | Kitaura et al. ................ 705/14 |
| 2002/0147780 A1 | * | 10/2002 | Liu et al. ..................... 709/206 |
| 2002/0184190 A1 | * | 12/2002 | Sugiura ........................... 707/1 |
| 2003/0182383 A1 | * | 9/2003 | He ............................ 709/206 |

FOREIGN PATENT DOCUMENTS

| | | |
|---|---|---|
| EP | 0 813 162 A2 | 12/1997 |
| EP | 1 085 436 A2 | 3/2001 |
| EP | 1 139 608 A2 | 10/2001 |
| JP | 2000-10880 | 1/2000 |
| JP | 2001-94589 | 4/2001 |
| JP | 2001-356989 | 12/2001 |
| JP | 2002-108780 | 4/2002 |
| JP | 2003-18220 | 1/2003 |

* cited by examiner

*Primary Examiner*—Nathan J Flynn
*Assistant Examiner*—Jeong S Park
(74) *Attorney, Agent, or Firm*—Oblon, Spivak, McClelland, Maier & Neustadt L.L.P.

(57) ABSTRACT

The detection conditions acquisition unit included in the mobile communication terminal acquires detection condition data including a letter string from the detection conditions distribution server and stores the data in the detection conditions storage unit The detection unit extracts, from among the mails received by the mail receiving unit, mails including a letter string included in the detection condition data stored in the detection conditions storage unit. Thus, the mobile communication terminal may acquire a letter string specified by the detection conditions distribution server to detect specific mail. Therefore, a letter string for detecting a particular mail is specified easily.

13 Claims, 13 Drawing Sheets

Fig.3

| LETTER STRING | CATEGORY | DISTRIBUTION PROCESSING INFORMATION | INFORMATION FOR APPLICATION OF DETECTION CONDITIONS | SELECTION INFORMATION |
|---|---|---|---|---|
| ADVERTISEMENT | ADVERTISEMENT | 2 | 2 | 1 |
| NOTIFICATION | ADVERTISEMENT | 2 | 2 | 2 |
| ⋮ | ⋮ | ⋮ | ⋮ | ⋮ |
| SEXY | ADULT | 1 | 1 | 1 |
| MARRIED WOMAN | ADULT | 1 | 1 | 1 |
| ⋮ | ⋮ | ⋮ | ⋮ | ⋮ |
| ABUSE | VIOLENCE | 1 | 1 | 1 |
| ⋮ | ⋮ | ⋮ | ⋮ | ⋮ |

Fig.4

| MAIL | DETECTION RESULT INFORMATION | ALREADY-READ FLAG |
|---|---|---|
| A | 0 | 0 |
| B | 0 | 1 |
| C | 1 | 1 |
| D | 2 | 1 |
| E | 3 | 0 |
| F | 0 | 0 |
| ⋮ | ⋮ | ⋮ |

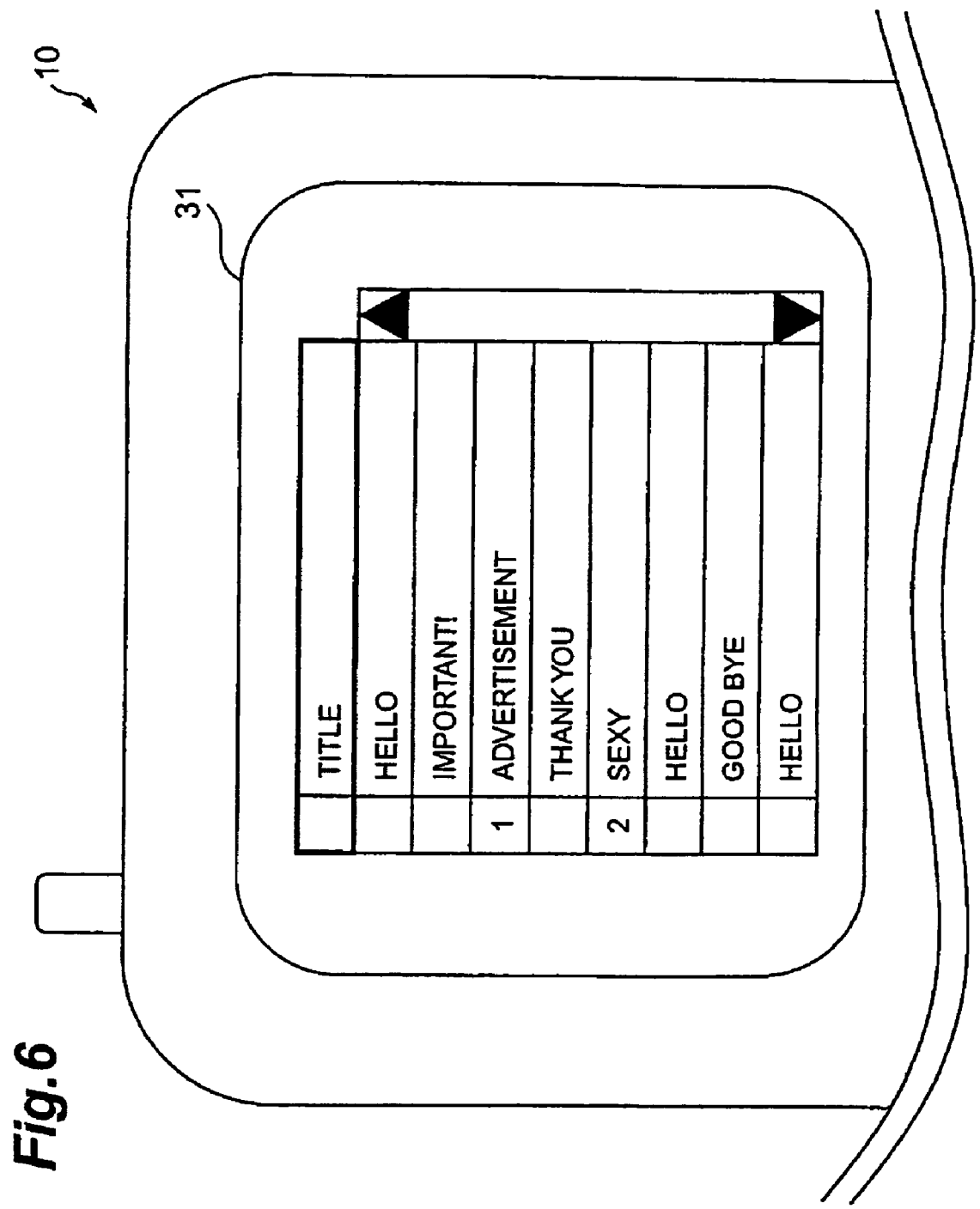

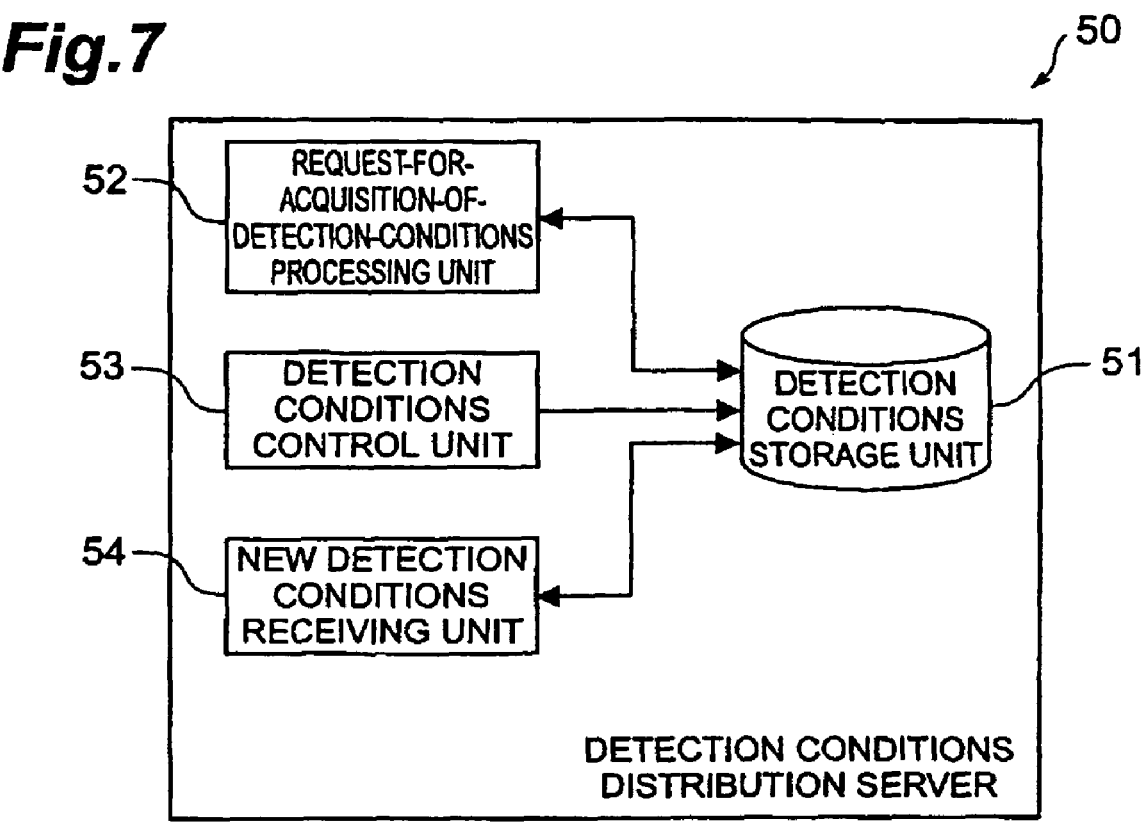

Fig.9

| CATEGORY | TERMINAL A | | TERMINAL B | | ... | TERMINAL N | |
|---|---|---|---|---|---|---|---|
| | DISTRIBUTION PROCESSING INFORMATION | INFORMATION FOR APPLICATION OF DETECTION CONDITIONS | DISTRIBUTION PROCESSING INFORMATION | INFORMATION FOR APPLICATION OF DETECTION CONDITIONS | ... | DISTRIBUTION PROCESSING INFORMATION | INFORMATION FOR APPLICATION OF DETECTION CONDITIONS |
| ADVERTISEMENT | 1 | 2 | 2 | 2 | ...... | 2 | 2 |
| ADULT | 1 | 1 | 1 | 1 | ...... | 2 | 2 |
| ...... | ...... | ...... | ...... | ...... | ...... | ...... | ...... |
| VIOLENCE | 1 | 1 | 1 | 1 | ...... | 2 | 2 |

MOBILE COMMUNICATION TERMINAL, DETECTION CONDITION DISTRIBUTION SERVER AND DETECTED MAIL NOTIFICATION RECEIVING SERVER

BACKGROUND OF THE INVENTION

1. Field of the Invention

The present invention relates to a mobile communication terminal and, more particularly, to a mobile communication terminal which has a function of extracting specific mail, a detection condition distribution server and a detected mail notification receiving server.

2. Related Background Art

In recent years, mobile communication terminals such as portable telephones, which have electronic mail (simply referred to as "mail" in the specification) sending/receiving functions, have been in widespread use. In above mobile communication terminal, a plurality of folders for storing received mail are prepared, and a specific mail address can be correlated with each folder. Additionally, the mobile communication terminal has a function of automatically distributing received mail to a folder correlated to a specific mail address when a sender address contained in the mail comforms to the specific mail address. By above function, for example, if folders for storing nuisance mail, advertisement mail or the like are prepared and known mail addresses of senders of the nuisance mail and the advertisement mail are correlated to the folders, mail which a user needs is automatically managed independently of the nuisance mail and the advertisement mail.

SUMMARY OF THE INVENTION

However, in the conventional mobile communication terminal which has the aforementioned function, the user must set mail addresses to be correlated to the folders, and this operation took time and labor. The above mail addresses of the senders of the nuisance mail and the advertisement mail are changed every hour, and thus mail address setting took more time and labor.

The present invention is made to solve the foregoing problem, and an object of the present invention is to provide a mobile communication terminal, a detection condition distribution server and a detected mail notification receiving server which are highly convenient to set a letter string such as a mail address to extract specific mail from received mail.

In order to achieve the foregoing object, a mobile communication terminal of the present invention includes mail receiving means for receiving mail from a mail server, detection conditions acquisition means for acquiring detection conditions data including a letter string from a detection conditions distribution server and storing the detection condition data in a detection conditions storage means, and detection means for performing detection processing for extracting the mail received by the mail receiving means when a condition, in which the mail includes a letter string conforming to the letter string included in the detection condition data stored in the detection conditions storage means, is satisfied.

In order to achieve the foregoing object, a method for detecting mail of the present invention which extracts specific mail from mail received by a mobile communication terminal, includes a detection condition acquisition step and a detection step. In the detection condition acquisition step, detection condition acquisition means, which is provided in the mobile communication terminal, acquires detection condition data including a letter string from a detection condition distribution server to store the data in detection condition storage means. In the detection step, detection means, which is provided in the mobile communication terminal, carries out detection processing for extracting the mail received by mail receiving means provided in the mobile communication terminal when a condition, in which the mail includes a letter string which conforms to the letter string included in the detection condition data stored in the detection condition storage means, is satisfied.

According to the present invention, the detection condition acquisition means downloads the detection condition data containing the letter string from the detection condition distribution server, and stores the data in the detection condition storage means. The "letter string" is a key word to extract a specific word from a title, a sender address, a text and the like, which constitute the mail. The detection means carries out the detection processing for extracting the mail received by the mail receiving means when the mail includes the letter string which comforms to the letter string includes in the detection condition data. Thus, since the letter string managed by the detection condition distribution server is used to carry out mail detection processing, there is no need for a user of the mobile communication terminal to set letter strings individually, and it is possible to increase the convenience.

In the mobile communication terminal of the present invention, preferably, the detection condition data includes a plurality of letter strings, and when a condition in which the mail received by the mail receiving means includes the plurality of letter strings conforming to each of the plurality of letter strings included in the detection condition data is satisfied, the detection means extracts the mail in the detection processing.

In the method for detecting mail of the present invention, preferably, the detection condition data contains a plurality of letter strings, and in the detection step, when a condition in which the mail received by the mail receiving means includes the plurality of letter strings conforming to each of the plurality of letter strings included in the detection condition data is satisfied, the detection means extracts the mail in the detection processing.

According to the present invention, the plurality of letter strings are included in the detection condition data. The detection means extracts the mail including a plurality of letter strings which comforms to the plurality of letter strings included in the detection condition data. By extracting the mail based on the plurality of letter strings, it is possible to increase detection processing accuracy. Specifically, if mail is extracted based on one letter string, even unnecessary mail may be extracted. However, by use of the plurality of letter strings, the occurrence of such a case can be reduced.

Preferably, the mobile communication terminal of the present invention further comprises detection condition addition and registration means for adding and registering the detection condition data inputted by the user in the detection condition storage means, and the detection means carries out the detection processing which includes the detection condition data added and registered in the detection condition storage means.

Preferably, the method for detecting mail of the present invention further includes a detection condition addition and registration step of adding and registering the detection condition data inputted by the user in the detection condition storage means by use of detection condition addition and registration means provided in the mobile communication terminal, and in the detection step, the detection means carries out the detection processing which includes the detection condition data added and registered in the detection condition storage means.

According to the present invention, the detection condition addition and registration means adds and registers the detection condition data inputted by the user in the detection condition storage means. The detection means carries out the detection processing by use of the added and registered detection condition data. Thus, it is possible to further add detection condition data which enables extraction of mail to be extracted by each user.

Preferably, the mobile communication terminal of the present invention further comprises list display means for displaying a list of information for identifying a plurality of mail received by the mail receiving means, and in the list displaying, the list display means displays information for identifying the mail extracted by the detection means in a mode different that of mail not extracted by the detection means.

Preferably, the method for detecting mail of the present invention further includes a list displaying step of displaying, by list display means provided in the mobile communication terminal, a list of information for identifying a plurality of mail received by the mail receiving means, and in the list displaying step, the list display means displays information for identifying the mail extracted by the detection means in a mode different from that of mail not extracted by the detection means.

According to the present invention, the list display means is provided to display the list of information (for example, a title, a sender address and the like of mail) for identifying the plurality of mail received by the mail receiving means. When the information for identifying the mail extracted by the detection means is displayed, the list display means displays it in the mode different from that of mail not extracted by the detection means. For example, the information for identifying the mail extracted by the detection means is displayed in a color different from that of the mail not extracted by the detection means, or is displayed by adding a predetermined symbol to the information for identifying the mail extracted by the detection means. Thus, the user can easily recognize the mail extracted by the detection means.

Preferably, in the mobile communication terminal of the present invention, the detection condition data contains category information which indicates a category of the letter string contained in the detection condition data, and in the list displaying, the list display means displays the mail extracted by the detection means in a mode indicating the category of the letter string which is contained in the detection condition data and which comforms to the letter string contained in the mail.

Preferably, in the method for detecting mail of the present invention, the detection condition data contains category information which indicates a category of the letter string contained in the detection condition data, and in the list displaying step, the list display means displays the mail extracted by the detection means in a mode indicating the category of the letter string which is contained in the detection condition data and which comforms to the letter string contained in the mail.

According to the present invention, the detection condition data, which is acquired from the detection condition distribution server by the detection condition acquisition means, contains the letter string and the category information indicating the category of this letter string. Here, the "category" indicates a kind of mail extracted by the letter string such as "advertisement", "adult", "violence" or "cartoon". In the list displaying, the list display means displays the mail extracted by the detection means in a mode which is different from one category of a letter string to another, the category being contained in the detection condition data and conforming to the letter string contained in the mail. For example, the mail extracted by the detection means is displayed in a color different for each category of the letter string contained in the detection condition data, or is displayed by adding a predetermined symbol indicating a category of the letter string contained in the detection condition data to the information for identifying the mail. Accordingly, the user can recognize the mail extracted by the detection means by differentiating it from not-extracted mail, and know a kind of the extracted mail (for example, mail regarding "advertisement" as described above).

Preferably, in the mobile communication terminal of the present invention, the detection condition acquisition means sends the category information inputted by the user to the detection condition distribution server, and acquires the detection condition data, which contains the letter string relevant to the category indicated by the category information and which is sent by the detection condition distribution server.

Preferably, in the method for detecting mail of the present invention, in the detection condition acquisition step, the detection condition acquisition means sends the category information inputted by the user to the detection condition distribution server, and acquires the detection condition data, which contains the letter string relevant to the category indicated by the category information and which is sent by the detection condition distribution server.

According to the present invention, when the detection condition data is acquired, the detection condition acquisition means sends the category information inputted by the user to the detection condition distribution server. Then, the detection condition distribution server receives the category information sent from the mobile communication terminal, and sends the detection condition data containing the category information to the mobile communication terminal. Thus, the mobile communication terminal can acquire the detection condition data by selecting the category of the letter string.

Preferably, the mobile communication terminal further comprises detection condition selection control means for storing selection information, which regards whether the letter string included in the detection condition data acquired by the detection condition acquisition means is applied to the detection processing or not, corresponding to the letter string based on selection by a user, and the detection means apllies the letter string to the detection processing when the application of the letter string to the detection processing is selected, based on the selection information corresponding to the letter string included in the detection condition data.

Preferably, the method for detecting mail of the present invention further includes a detection condition selection control step for storing, by detection condition selection control means provided in the mobile communication terminal, selection information, which regards whether the letter string included in the detection condition data acquired by the detection condition acquisition means is applied to the detection processing, corresponding to the letter string based on selection by a user, and in the detection step the detection means apllies the letter string to the detection processing when the application of the letter string to the detection processing is selected, based on the selection information corresponding to the letter string included in the detection condition data.

According to the present invention, the detection condition selection control means stores the selection information, which regards whether the letter string contained in the detection condition data is applied to the detection processing, based on the selection by the user. By the detection means, the letter string, which is selected to be applied to the detection processing, is applied to the aforementioned detection processing based on the selection information. Thus, the user of the mobile communication terminal can select and apply only the letter string required for the detection processing after the detection condition data is acquired from the detection condition distribution server.

Preferably, in the mobile communication terminal of the present invention, the detection condition data contains category information indicating a category of the letter string contained in the detection condition data, and the detection condition selection control means stores the selection information, which corresponds to the letter string contained in the detection condition data containing the category information, based on specification of the category information and the selection information by the user.

Preferably, in the method for detecting mail of the present invention, the detection condition data contains category information indicating a category of the letter string contained in the detection condition data, and in the detection condition control step, the detection condition selection control means stores the selection information, which corresponds to the letter string contained in the detection condition data containing the category information, based on specification of the category information and the selection information by the user.

According to the present invention, the user of the mobile communication terminal can set the selection information for each category of the letter string contained in the detection condition data. Thus, only the letter string which enables detection of kinds of mail (for example, mail belonging to a kind "advertisement") needed to be extracted by the detection processing can be applied to the detection processing.

Preferably, the mobile communication terminal of the present invention further comprises detected mail deletion means for deleting the mail received by the mail receiving means when the mail is extracted by the detection means.

Preferably, the method for detecting mail of the present invention further includes a detected mail deletion step of deleting, by detected mail deletion means provided in the mobile communication terminal, the mail received by the mail receiving means when the mail is extracted by the detection means.

According to the present invention, since the mail is deleted by the detected mail deletion means when the mail is extracted by the detection means, the user can eliminate the mail without reading it.

Preferably, the mobile communication terminal of the present invention further comprises detected mail selection deletion means for providing a display for prompting a user to select whether or not to delete the mail extracted by the detection means and for deleting the mail based on the selection by the user in response to the display.

Preferably, the method for detecting mail of the present invention further includes a detected mail selection deletion step of providing, by detected mail selection deletion means provided in the mobile communication terminal, a display for prompting a user to select whether no not to delete the mail extracted by the detection means, and deleting the mail based on the selection by the user in response to the display.

According to the present invention, the detected mail selection deletion means provides a display for prompting the user to select whether or not to delete the mail extracted by the detection means, and deleting the mail when the user selects the deletion in response to the display. Thus, by the detected mail selection deletion means, the user can recognize the mail extracted by the detection means, and delete the mail only when deletion is necessary.

Preferably, the mobile communication terminal of the present invention further comprises detected mail deletion means for deleting the mail when the mail received by the mail receiving means is extracted by the detection means, detected mail selection deletion means for providing a display for prompting the user to select whether or not to delete the mail extracted by the detection means and for deleting the mail based on the selection by the user in response to the display, and first detected mail processing control means for storing information regaarding distribution processing as to whether the mail extracted by the detection means is processed by the detected mail deletion means or the detected mail selection deletion means, based on an input by an administrator to the mobile communication terminal The detection means distributes the processing of the mail to the detected mail deletion means or the detected mail selection deletion means when the mail is extracted by the detection processing, based on the information regarding the distribution processing stored by the first detected mail processing control means. The detected mail deletion means deletes the mail when the mail is distributed by the detection means to the detected mail delete means. The detected mail selection deletion means provides a display for prompting a user to select whether or not to delete the mail and deletes the mail based on the selection by the user in response to the display when the mail is distributed by the detection means to the detected mail selection delete means.

Preferably, the method for detecting mail of the present invention further includes a detected mail deletion step of deleting the mail by use of detected mail deletion means provided in the mobile communication terminal when the mail received by the mail receiving means is extracted by the detection means, a detected mail selection deletion step of providing a display for prompting a user to select whether or not to delete the mail and deleting the mail based on the selection by the user in response to the display by use of detected mail selection deletion means provided in the mobile communication terminal, and a first detected mail processing control step of storing, by first detected mail processing control means provided in the mobile communication terminal, information regarding distribution processing as to whether the mail extracted by the detection means is processed by the detected mail deletion means or the detected mail selection deletion means, based on an input by an administrator to the mobile communication terminal. In the detection step, the detection means distributes the processing of the mail to the detected mail deletion means or the detected mail selection deletion means when the mail is extracted by the detection processing, based on the information regarding the distribution processing stored by the first detected mail processing control means. In the detected mail deletion step, the detected mail deletion means deletes the mail when the mail is distributed by the detection means to the detected mail delete means. In the detected mail selection deletion step, the detected mail selection deletion means provides a display for prompting a user to select whether or not to delete the mail and deletes the mail based on the selection by the user in response to the display when the mail is distributed by the detection means to the detected mail selection delete means.

According to the present invention, the first detected mail processing control means stores the information, which regards the distribution processing of the detected mail as to whether the mail extracted by the detection means is processed by the detected mail deletion means or the detected mail selection deletion means, based on the specification by the administrator of the mobile communication terminal. The detection means distributes the processing of the mail extracted by the detection processing to the detected mail deletion means or the detected mail selection deletion means based on the information regarding the distribution processing. The administrator manages setting of the mobile communication terminal. For example, when the user of the mobile communication terminal is a child, his or her parent manages setting of the mobile communication terminal as an administrator. Thus, in the mobile communication terminal of the user, the administrator can set automatic deletion of the mail extracted by the detection means, or permission of selection whether to delete the mail to the user.

Preferably, in the mobile communication terminal of the present invention, the detection condition data contains category information of the letter string contained in the detection condition data. The first detected mail processing control means stores the information regarding the distribution processing inputted for each category by the administrator to the mobile communication terminal, corresponding to the category information indicating each category. When the mail is extracted by the detection processing, the detection means refers to the category information contained in the detection condition data containing the letter string coincident with to the letter string being contained in the mail, and distributes the mail processing to the detected mail deletion means or the detected mail selection deletion means based on the information, which regards the distribution processing stored by the first detected mail processing control means, corresponding to the category information which has been referred to. The detected mail deletion means deletes the mail when the mail is distributed by the detection means. When the mail is distributed by the detection means, the detected mail selection deletion means provides a display for prompting the user to select whether or not to delete the mail, and deletes the mail based on the selection by the user in response to the display.

Preferably, in the method for detecting mail of the present invention, the detection condition data contains the category information indicating the category of the letter string contained in the detection condition data. In the first detected mail processing control step, the first detected mail processing control means stores the information regarding the distribution processing entered for each category by the administrator to the mobile communication terminal, corresponding to the category information indicating each category. In the detection step, when the mail is extracted by the detection processing, the detection means refers to the category information contained in the detection condition data containing the letter string coincident with the letter string being contained in the mail, and distributes the mail processing to the detected mail deletion means or the detected mail selection deletion means based on the information, which regards the distribution processing stored by the first detected mail processing control means, corresponding to the category information which has been referred to. In the detected mail deletion step, the detected mail deletion means deletes the mail when the mail is distributed by the detection means. In the detected mail selection deletion step, when the mail is distributed by the detection means, the detected mail selection deletion means provides a display for prompting the user to select whether or not to delete the mail, and deletes the mail based on the selection by the user in response to the displaying.

According to the present invention, the detected mail processing control means stores the information regarding the distribution processing for each category specified by the administrator of the mobile communication terminal. Thus, in accordance with a category of the letter string contained in the detection data which comforms to the letter string contained in the mail being extracted by the detection means, the processing can be switched between automatic deletion of the mail and the displaying intended for prompting the user to select deletion. For example, as for mail which comforms to a letter string of a category "advertisement", displaying is executed to prompt selection of deletion, and as for mail which comforms to a letter string of a category "adult", automatic deletion is executed. Thus, it is possible to increase convenience of running the mobile communication terminal for the administrator.

Preferably, the mobile communication terminal of the present invention further comprises detected mail deletion means, detected mail selection deletion means, and detected mail processing information acquisition means. The detected mail deletion means is for deleting the mail received by the mail receiving means when the mail is extracted by the detection means. The detected mail selection deletion means is for providing a display for prompting the user to select whether or not to delete the mail extracted by the detection means, and deleting the mail based on the selection by the user in response to the displaying. The detected mail processing information acquisition means is for acquiring information, which regards distribution processing as to whether the mail extracted by the detection means is processed by the detected mail deletion means or the detected mail selection deletion means, from the detection condition distribution server. Further, when the mail is extracted by the detection processing, the detection means distributes the mail processing to the detected mail deletion means or the detected mail selection deletion means based on the information, which regards the distribution processing information acquired by the detected mail processing information acquisition means. When the mail is distributed by the detection means, the detected mail deletion means deletes the mail. When the mail is distributed by the detection means, the detected mail selection deletion means provides a display for prompting the user to select whether to delete the mail, and deletes the mail based on the selection by the user in response to the display.

A detection condition distribution server of the present invention which controls detection condition data including a letter string for extracting specific mail received by a mobile communication terminal, comprises second detected mail processing control means. The second detected mail processing control means stores information regarding distribution processing for specifying that each of a plurality of mobile communication terminals automatically deletes mail or that a user is allowed to select the deletion, when the mail received by each of the plurality of mobile communication terminals which acquires the detection condition data satisfy a condition in which the mail include letter strings conforming to the letter string included in the detection condition data, based on specification by an administrator of each of the plurality of mobile communication terminals such that each piece of the information is associated with the information for identifying each of the mobile communication terminals.

The method for detecting mail of the present invention includes a second detected mail processing control step, a detected mail processing information acquisition step, a detected mail deletion step, and a detected mail selection deletion step. In the second detected mail processing control step, when a condition is satisfied, in which the mail received by the plurality of mobile communication terminals for acquiring the detection condition data includes a letter string which comforms to the letter string contained in the detection condition data, information, which regards distribution processing as to automatic deletion of mail at a plurality of mobile communication terminals or permission of deletion selection by a user, is stored, by second detected mail processing control means provided in a detection condition distribution server, corresponding to information for identifying the mobile communication terminal based on specification by each of administrations of the plurality of mobile communication terminals. In the detected mail processing information acquisition step, the information, which regards the distribution processing corresponding to the information for identifying the mobile communication terminal from the second detected mail processing control means provided in the detection condition distribution server, is acquired by detected mail processing information acquisition means provided in the mobile communication terminal. In the detected mail deletion step, when the mail received by the mail receiving means is extracted by the detection means, the mail is deleted by detected mail deletion means provided in the mobile communication terminal. In the detected mail selection deletion step, a display for prompting the user to select whether or not to delete the mail extracted by the detection means is provided, and the mail based on selection by the user in response to the displaying is deleted by detected mail selection deletion means provided in the mobile communication terminal. Further, in the detection step, when the mail is extracted by the detection processing, the detection means distributes the mail processing to the detected mail deletion means or the detected mail selection deletion means based on the information, which regards the distribution processing acquired by the detected mail processing information acquisition means. In the detected mail deletion step, when the mail is distributed by the detection means, the detected mail deletion means deletes the mail. In the detected mail selection deletion step, when the mail is distributed by the detection means, the detected mail selection deletion means provides a display for prompting the user to select whether or not to delete the mail, and deletes the mail based on the selection by the user in response to the display.

According to the present invention, the second detected mail processing control means provided in the detection condition distribution server stores the information, which regards the distribution processing of the detected mail as to whether the mail is processed by the detected mail deletion means or the detected mail selection deletion means, based on the specification by the administrator of the mobile communication terminal when the mail, which comforms to the letter string contained in the detection condition detection data, is extracted by the detection means provided in the mobile communication terminal. The detected mail processing information acquisition means provided in the mobile communication terminal acquires the information, which regards the distribution processing stored for the mobile communication terminal from the second detected mail processing control means. The detection means distributes the processing of the mail to the detected mail deletion means or the detected mail selection deletion means based on the information regarding the distribution processing when the mail is extracted by the detection processing. Thus, for example, in the mobile communication terminal used by a child, a parent as its administrator registers setting such that the mail extracted by the detection means is always deleted or selection of its deletion is permitted to the child in the server, and thus, processing of the mail extracted in the mobile communication terminal, where this setting is acquired, can be controlled.

Preferably, in the mobile communication terminal of the present invention, the detection condition data contains category information indicating a category of the letter string contained in the detection condition data. The detection mail processing information acquisition means acquires the information, which regards the distribution processing stored corresponding to the category information for each category, from the detected condition distribution server. When the mail is extracted by the detection processing, the detection means refers to the category information contained in the detection condition data containing the letter string coincident with the letter string being contained in the mail, and distributes the mail processing to the detected mail deletion means or the detected mail selection deletion means based on, among the information regarding the distribution processing acquired by the detected mail processing information acquisition means, the information which regards the distribution processing information corresponding to the category information which has been referred to. The detected mail deletion means deletes the mail when the mail is distributed by the detection means, and when the mail is distributed by the detection means, the detected mail selection deletion means provides a display for prompting the user to select whether or not to delete the mail, and deletes the mail based on the selection by the user in response to the display.

Preferably, in the detection condition distribution server of the present invention, the detection condition data contains category information indicating a category of the letter string contained in the detection condition data, and the second detected mail processing control means stores the information, which regards the distribution processing specified for each category by the administrator of each of the plurality of mobile communication terminals, corresponding to the category information indicating each category and information for identifying the mobile communication terminal.

In the method for detecting mail of the present invention, the detection condition data contains the category information indicating the category of the letter string contained in the detection condition data. In the second detected mail processing control step, the second detected mail processing control means stores the information, which regards the distribution processing specified for each category by the administrator of each of the plurality of mobile communication terminals, corresponding to the category information and the information for identifying the mobile communication terminal, in the detected mail processing information acquisition step, the detected mail processing information acquisition means provided in the mobile communication terminal acquires the information, which regards the distribution processing stored corresponding to the information for identifying the mobile communication terminal, together with the corresponding category information from the detection condition distribution server. When the mail is extracted by the detection processing, the detection means refers to the category information contained in the detection condition data containing the letter string coincident with the letter string contained in the mail, and distributes the extracted mail processing to the detected mail deletion means or the detected mail selection deletion means based on, among the information which regards the distribution processing acquired by the detected mail processing information acquisition means, the information, which regards the distribution processing information corresponding to the category information which has been referred to. In the detected mail deletion step, the detected mail deletion means deletes the mail when the mail is distributed by the detection means. In the detected mail selection deletion step, when the mail is distributed by the detection means, the detected mail selection deletion means provides a display for prompting the user to select whether to delete the mail, and deletes the mail based on selection by the user in response to the display.

According to the present invention, the second detected mail processing control means provided in the detection condition distribution server stores the information, which regards the distribution processing specified for each category by the administrator of each of the plurality of mobile communication terminals, corresponding to the category information indicating each category and the information for identifying each of the plurality of mobile communication terminals. Thus, for example, in the mobile communication terminal used by a child, a parent as its administrator can set, for each category of the letter string contained in the detection condition data, such that the mail extracted by the detection means is always deleted or selection of its deletion is permitted to the child, and register the setting in the detection condition distribution server. Alternatively permitting the child to select the deletion is set for each category of the letter string contained in the detection condition data, and is registered in the detection condition distribution server. More specifically, for example, as for mail containing a letter string coincident with a letter string contained in a category of "advertisement", displaying is executed to prompt selection of deletion, and as for mail containing a letter string coincident with a letter string contained in a category of "adult" automatic deletion is selected. The above selection can be made in the detection condition distribution server.

Preferably, in the mobile communication terminal of the present invention, the detection condition data contains category information which indicates a category of the letter string contained in the detection condition data, and in the displaying for prompting the user to select whether to delete the mail, the detected mail selection deletion means displays the mail extracted by the detection means in a mode indicating the category of the letter string which is contained in the detection condition data and which comforms to the letter string contained in the mail in displaying for prompting the user to select whether to delete the mail.

Preferably, in the method for detecting mail of the present invention, the detection condition data contains category information which indicates a category of the letter string contained in the detection condition data, and in the detected mail selection deletion step, the detected mail selection deletion means displays the mail extracted by the detection means in a mode indicating the category of the letter string which is contained in the detection condition data and which comforms to the letter string contained in the mail in displaying for prompting the user to select whether to delete the mail.

According to the present invention, in the displaying for prompting the user to select whether to delete the mail extracted by the detection means, the detected mail selection deletion means displays the mail on the mode indicating the category of the letter string which is contained in the detection condition data and which comforms to the letter string contained in the mail as described above. For example, in the displaying for prompting the user to select whether to delete the mail extracted by the detection means, a method of simultaneously displaying symbols or colors different from one category to another can be employed. Accordingly, the user can know which category of letter strings the mail is extracted in selecting whether to delete the mail extracted by the detection means.

Preferably, the mobile communication terminal of the present invention further comprises first detection condition application control means for storing detection condition application information which regards whether application of the letter string included in the detection condition data acquired by the detection conditions acquisition means to the detection processing by the detection means is indispensable or the application can be selected by a user, based on the input to the mobile communication terminal by an administrator. The detection means applies the letter string to the detection processing when the letter string included in the detection condition data is indispensable for the detection processing or when the application of the letter string included in the detection condition data to the detection processing can be freely selected and the user selects to allow the letter string to be applied to the detection processing, based on the detection condition application information stored by the first detection conditions application control means.

Preferably, the method for detecting mail of the present invention further includes a first detection condition application control step of storing detection condition application information which regards whether application of the letter string included in the detection condition data acquired by the detection conditions acquisition means to the detection processing by the detection means is indispensable or the application can be selected by a user, based on the input to the mobile communication terminal by an administrator. In the detection step, the detection means applies the letter string to the detection processing when the letter string included in the detection condition data is indispensable for the detection processing or when the application of the letter string included in the detection condition data to the detection processing can be freely selected and the user selects to allow the letter string to be applied to the detection processing, based on the detection condition application information stored by the first detection conditions application control means.

According to the present invention, the first detection condition application control means stores the detection condition application information, which regards whether application of the letter string included in the detection condition data acquired by the detection conditions acquisition means to the detection processing by the detection means is indispensable or the application can be selected by a user, based on the input to the mobile communication terminal by an administrator. Thus, for example, it is possible to set such that the application of the letter string to the detection processing is made essential in the mobile communication terminal used by the child, or selection of its application is permitted to the child.

Preferably, in the mobile communication terminal of the present invention, the detection condition data contains category information which indicates a category of the letter string contained in the detection condition data. The first detection condition application control means stores the detection condition application information inputted for each category by the administrator to the mobile communication terminal corresponding to the category information which indicates the category. The detection means refers to the category information contained in the detection condition data. Then, when the application of the letter string contained in the detection condition data to the detection processing is essential or is freely selected based on the detection condition application information stored by the first detection condition application control means corresponding to the category information, if the user selects the application of the letter string to the detection processing, the detection means applies the letter string to the detection processing.

Preferably, in the method for detecting mail of the present invention, the detection condition data contains category information which indicates a category of the letter string contained in the detection condition data. In the first detection condition application control step, the first detection condition application control means stores the detection condition application information entered for each category by the administrator to the mobile communication terminal corresponding to the category information which indicates the category. In the detection step, the detection means refers to the category information contained in the detection condition data. Then, when the application of the letter string contained in the detection condition data to the detection processing is essential or is freely selected based on the detection condition application information stored by the first detection condition application control means corresponding to the category information, if the user selects the application of the letter string to the detection processing, the detection means applies the letter string to the detection processing.

According to the present invention, the first detection condition application control means sets the detection condition application information for each category specified by the administrator of the mobile communication terminal. Thus, for example, it is possible to set such that the parent makes essential the application of the letter string to the detection processing in the mobile communication terminal used by the child for each category, or selection of the application is permitted to the child. More specifically, for example, it can be set such that the child user of the mobile communication terminal can select application of a letter string belonging to a category "advertisement" to the detection processing, or a letter string belonging to a category "adult" is always applied to the detection processing.

Preferably, the mobile communication terminal of the present invention further comprises detection condition application information acquisition means for acquiring detection condition application information from the detection condition distribution server. Here, the detection condition application information regards whether application of the letter string, which is contained in the detection condition data acquired by the detection condition acquisition means, to the detection processing by the detection means is indispensable or the application can be selected by the user. The detection means applies the letter string to the detection processing when the letter string is always applied to the detection processing or when the application of the letter string to the detection processing can be freely selected and the user selects to allow the letter string to be applied to the detection processing based on the detection condition application information acquired by the detection condition application information acquisition means.

Preferably, the detection condition distribution server of the present invention further comprises second detection condition application control means for storing detection condition application information among pieces of mail received by the plurality of mobile communication terminals, which acquire the detection condition data, based on specification by the administrator of the mobile communication terminal corresponding to information for identifying the mobile communication terminal. Here, detection condition application information regards whether application of the letter string contained in the detection condition data should be made essential in order to extract the specific mail or the application can be selected by the user of the mobile communication terminal.

Preferably, the method for detecting mail of the present invention further includes a second detection condition application control step, and detection condition application information acquisition step. In a second detection condition application control step, detection condition application information among pieces of mail received by the plurality of mobile communication terminals which acquire the detection condition data is stored, by the second detection condition application control means provided in the detection condition distribution server, based on specification by the administrator of the mobile communication terminal corresponding to information for identifying the mobile communication terminal. Here, detection condition application information regards whether application of the letter string contained in the detection condition data is indispensable in order to extract the specific mail or the application can be selected by the user of the mobile communication terminal. In a detection condition application information acquisition step, by the detection condition application control means provided in the mobile communication terminal, the detection condition application information is acquired corresponding to the information for identifying the mobile communication terminal from the second detection condition application control means provided in the detection condition distribution server. Further, in the detection step, the detection means applies the letter string to the detection processing when the application of the letter string contained in the detection condition data to the detection processing is indispensable, or is freely selected based on the detection condition application information acquired by the detection condition application information acquisition means, if the user selects the application of the letter string to the detection processing.

According to the present invention, the second detection condition application control means provided in the detection condition distribution server stores the detection condition application information based on the specification by the administrator of the mobile communication terminal corresponding to information for identifying the mobile communication terminal. Here, the detection condition application information regards whether application of the letter string, which is contained in the detection condition data acquired by the detection condition acquisition means being provided in the mobile communication terminal, is indispensable or the application can be selected by the user of the mobile communication terminal. Then, the detection condition application information acquisition means provided in the mobile communication terminal acquires the detection condition application information stored for the mobile communication terminal from the second detection condition application control means. The detection means provided in the mobile communication terminal determines necessity of application of the letter string to the detection processing based on the detection condition application information, and carries out the detection processing. Thus, for example, it is possible to set such that the application of the letter string to the detection processing in the mobile communication terminal used by the child is essential, or the parent can register permission of selection of the application to the child in the detection condition distribution server.

Preferably, in the mobile communication terminal of the present invention, the detection condition data contains category information which indicates a category of the letter string contained in the detection condition data, and the detection condition application information acquisition means acquires the detection condition application information stored for each category corresponding to the category information from the detection condition distribution server. In application of the letter string contained in the detection condition data to the detection processing, the detection means refers to the category information contained in the detection condition data. Then, when the application of the letter string to the detection processing is indispensable or is freely selected based on the detection condition application information corresponding to the category information, which has been referred to, among the detection condition application information acquired by the detection condition application information acquisition means, if the user selects the application of the letter string to the detection processing, the detection means applies the letter string to the detection processing.

Preferably, in the detection condition distribution server of the present invention, the detection condition data contains category information which indicates a category of the letter string contained in the detection condition data. The second detection condition application control means manages the detection condition application information specified for each category by the administrator of each of the plurality of mobile communication terminals corresponding to the category information of each category and information for identifying each mobile communication terminal.

Preferably, in the method for detecting mail of the present invention, the detection condition data contains category information which indicates a category of the letter string contained in the detection condition data. In the second detection condition application control step, the second detection condition application control means stores the detection condition application information specified for each category by the administrator of each of the plurality of mobile communication terminals corresponding to the category information of each category and information for identifying each mobile communication terminal. In the detection condition application information acquisition step, the detection condition application information acquisition means acquires the detection condition application information stored corresponding to the information for identifying the mobile communication terminal together with the corresponding category information from the detection condition distribution server. In the detection step, in application of the letter string contained in the detection condition data to the detection processing, the detection means refers to the category information contained in the detection condition data. Then, based on the detection condition application information corresponding to the category information, which has been referred to, among the detection condition application information acquired by the detection condition application information means, when the application of the letter string to the detection processing is indispensable or is freely selected, if the user selects the application of the letter string to the detection processing, the detection means applies the letter string to the detection processing.

According to the present invention, the second detection condition application control means provided in the detection condition distribution server stores the detection condition application information specified for each category by the administrator of the plurality of mobile communication terminals corresponding to the category information indicating each category and the information for identifying the mobile communication terminal. Thus, for example, the parent can register, in the detection condition distribution server for each category, setting such that the application of the letter string to the detection processing in the mobile communication terminal used by the child is made essential, or selection of the application is permitted to the child. More specifically, for example, it is possible to register, in the detection condition distribution server, setting such that the child can select necessity of application of a letter string belonging to a category "advertisement", or application of a letter string belonging to a category "adult" is made essential, or the like.

Preferably, the mobile communication terminal of the present invention further includes detected mail notification processing means for sending information regarding the mail extracted by the detection means to a detected mail notification receiving server.

A detected mail notification receiving server of the present invention comprises detected mail receiving means for receiving information regarding mail including a letter string conforming to a letter string for detecting specific mail which is sent by a mobile communication terminal, and communication charge return instruction means for sending instruction information for instructing billing control server to perform reduction processing of the communication charge for the mail to the billing control server, based on information regarding the mail received by the detected mail receiving means.

Preferably, the method for detecting mail of the present invention further includes a detected mail notification step, a detected mail receiving step, and a communication charge return instruction step. In the detected mail notification step, information, which regards the mail extracted by the detection means, is sent to a detected mail notification receiving server by detected mail notification processing means provided in the mobile communication terminal. In the detected mail reception step, the information, which regards mail sent by the detected mail notification processing means, is sent by detected mail receiving means provided in the detected mail notification receiving server. In the communication charge return instruction step, instruction information of instructing a billing control server to subtract processing for communication charges is sent, by communication charge return instruction means provided in the detected mail notification receiving server, based on the information regarding the mail which is received by the detected mail receiving means.

According to the present invention, the detected mail notification processing means provided in the mobile communication terminal sends the information, which regards the mail extracted by the detection means, to the detected mail notification receiving server. The detected mail receiving means in the detected mail notification receiving server receives the information regarding the mail. The communication charge return instruction means sends the instruction information for instructing the billing control server to subtract processing of communication charges based on the information regarding the mail. Thus, the communication charges can be returned for the mail extracted by the mobile communication terminal. More specifically, for example, when nuisance mail or the like is extracted by the detection means, if the detected mail notification processing means sends information regarding the nuisance mail to the detected mail notification receiving server, the communication charges can be returned from the billing control server.

Preferably, in the mobile communication terminal of the present invention, the detected mail notification processing means sends the information regarding the mail to the detected mail notification receiving server only when the mail extracted by the detection means is deleted without its content being displayed.

Preferably, in the method for detecting mail of the present invention, in the detected mail notification step, the detected mail notification processing means sends the information regarding the mail to the detected mail notification receiving server only when the mail extracted by the detection means is deleted without its content being displayed.

According to the present invention, the detected mail notification processing means sends the information regarding the mail to the detected mail notification receiving server only when the user deletes the mail extracted by the detection means without reading it. Thus, irrespective of extraction by the detection means, for mail read by the user, returning of communication charges from the billing control server can be prevented.

Preferably, in the mobile communication terminal of the present invention, the detected mail notification processing means stores the mail extracted by the detection means until the number of pieces of mail is reached to a predetermined number, and then notifies the information regarding the mail to the detected mail notification receiving server.

Preferably, in the method for detecting mail of the present invention, in the detected mail notification step, the detected mail notification processing means stores the mail extracted by the detection means until the number of pieces of mail is reached to a predetermined number, and then notifies the information regarding the mail to the detected mail notification receiving server.

According to the present invention, the detected mail notification processing means stores the mail extracted by the detection means until the number of pieces of mail is reached to a predetermined number, and then sends it to the detected mail notification receiving server. Thus, since its information is not sent each time mail is extracted by the detection means, it is possible to reduce communication traffic and the load of a communication charge for the user.

In the mobile communication terminal of the present invention, the detected mail notification processing means may store the mail extracted by the detection means until a predetermined period is reached, and then notify the information regarding the mail to the detected mail notification receiving server.

In the method for detecting mail of the present invention, in the detected mail notification step, the detected mail notification processing means may store the mail extracted by the detection means until a predetermined period is reached, and then notify the information regarding the mail to the detected mail notification receiving server.

According to the present invention, the detected mail notification processing means stores the mail extracted by the detection means until the predetermined period is reached, and then sends it to the detected mail notification receiving server. Thus, since its information is not sent each time mail is extracted by the detection means, it is possible to reduce communication traffic and the load of a communication charge for the user.

Preferably, in the mobile communication terminal of the present invention, the detected mail notification processing means displays communication charges of the mail returned by notifying the information regarding the mail to the detected mail notification receiving server.

Preferably, the method for detecting mail of the present invention further includes a returned charge display step of displaying, by the detected mail notification processing means, communication charges of the mail returned by notifying the information regarding the mail to the detected mail notification receiving server.

According to the present invention, the detected mail notification processing means calculates communication charges of the mail returned from the billing control server and displays the amount thereof by notifying the information, which regards the mail extracted by the detection means, to the detected mail notification receiving server. Thus, the user can know the amount of the communication charges to be returned beforehand.

In the mobile communication terminal of the present invention, the information regarding the mail may be the number of pieces of mail extracted by the detection means.

In the method for detecting mail of the present invention, the information regarding the mail may be the number of pieces of mail extracted by the detection means.

According to the present invention, the detected mail notification processing means sends the number of pieces of mail as the information regarding the mail extracted by the detection means. Thus, the detected mail notification receiving server calculates communication charges based on the number of pieces of the mail, and instructs subtraction processing of the communication charges to the billing control server. As a result, the communication charges can be returned from the billing control server to the mobile communication terminal.

In the mobile communication terminal of the present invention, the information regarding the mail may be the communication amount of the mail extracted by the detection means.

In the method for detecting mail of the present invention, the information regarding the mail may be the communication amount of the mail extracted by the detection means.

According to the present invention, the detected mail notification processing means sends the communication amount, for example, the number of packets, as the information regarding the mail extracted by the detection means. Thus, the detected mail notification receiving server calculates communication charges based on the communication amount, and instructs subtraction processing of the communication charges to the billing control server. As a result, the communication charges can be returned from the billing control server to the mobile communication terminal.

BRIEF DESCRIPTION OF THE DRAWINGS

FIG. 3 is a view showing detection condition data stored in a detection condition storage section of the mobile communication terminal of the embodiment.

FIG. 4 is a view showing mail stored in a mail storage section of the mobile communication terminal of the embodiment.

FIG. 6 is a view showing an example of a screen displayed by a list display section of the mobile communication terminal of the embodiment.

FIG. 7 is a block diagram illustrating a functional configuration of a detection condition distribution server according to an embodiment.

FIG. 8 is a view showing detection condition data stored in a detection condition storage unit of the detection condition distribution server of the embodiment.

FIG. 9 is a view showing setting of each mobile communication terminal stored in the detection condition storage unit of the detection condition distribution server of the embodiment.

DESCRIPTION OF THE PREFERRED EMBODIMENTS

Figure 1:
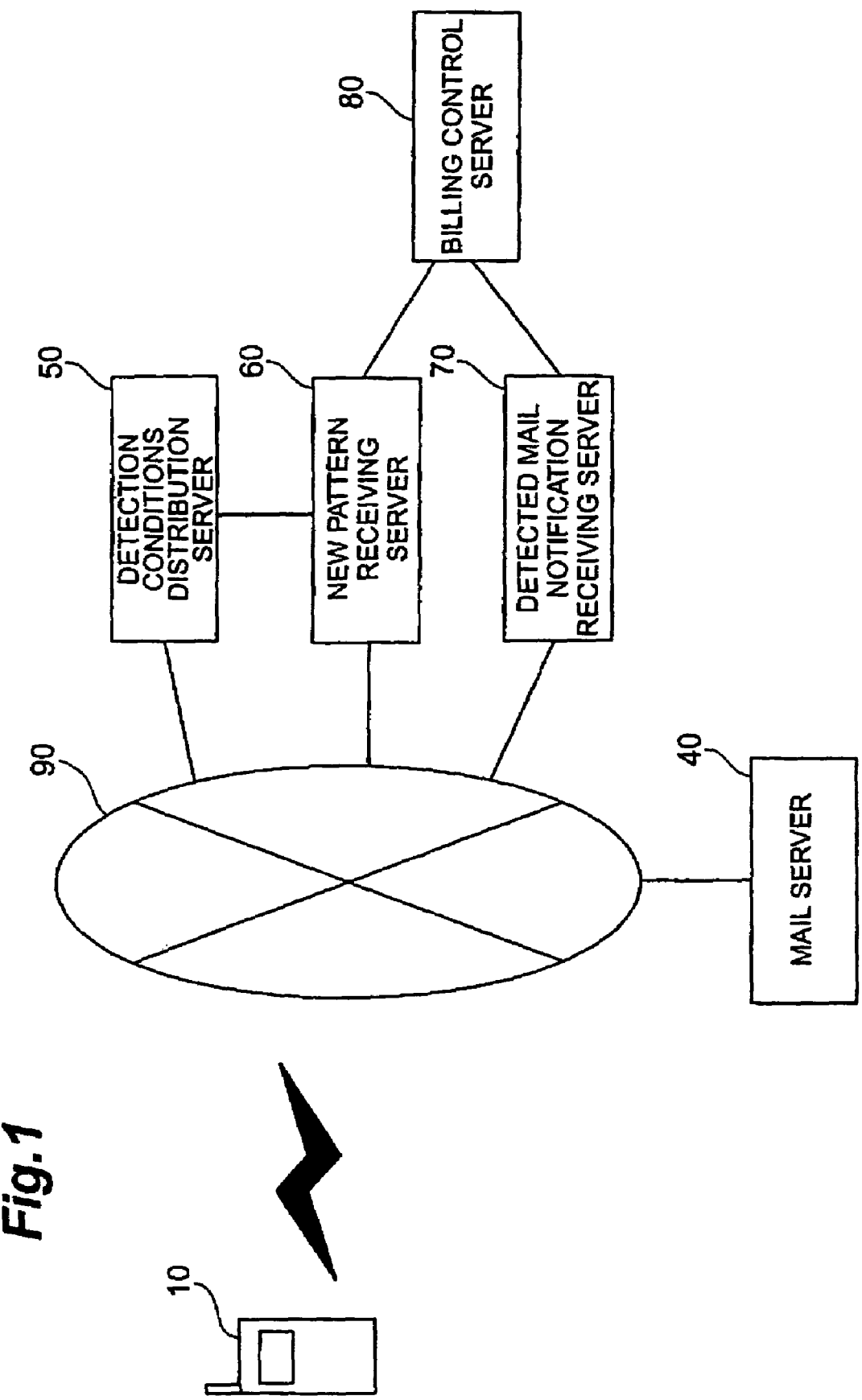
FIG. 1 is a block diagram illustrating a functional configuration of a mail detection system according to an embodiment.

A mail detection system 1 according to the embodiments of the present invention will be described with reference to the attached drawings. FIG. 1 is a figure for illustrating the mail detection system 1 according to the present embodiment. The mail detection system 1 according to the present embodiment is structured to include: a plurality of mobile communication terminals 10 (only one of them is shown in FIG. 1); a mail server 40; a detection conditions distribution server 50; a new pattern receiving server 60; a detected mail notification receiving server 70; and a billing control server 80. The mobile communication terminal 10, the mail server 40, the detection conditions distribution server 50, the new pattern receiving server 60, the detected mail notification receiving server 70, and the billing control server 80 are connected to a mobile communication network 90. It is noted that the detection conditions distribution server 50, the new pattern receiving server 60, and the detected mail notification receiving server 70 in FIG. 1 are illustrated as individual servers, respectively, but one server may have all functions performed by these servers. Hereinafter, the mobile communication terminal 10, the mail server 40, the detection conditions distribution server 50, the new pattern receiving server 60, the detected mail notification receiving server 70, and the billing control server 80 will be described in detail, respectively.

First, the detection conditions distribution server 50 will be described. The detection conditions distribution server 50 controls a plurality of pieces of detection condition data to be distributed to the mobile communication terminal 10. This detection conditions distribution server 50 physically includes; a central processing unit (CPU), a memory device (e.g., memory); a storage device (e.g., hard disc); a display device (e.g., display); an input device (e.g., keyboard); and a communication device used for the transmission of detection condition data or the like.

Next, functional structure of the detection conditions distribution server 50 will be described. FIG. 7 is a block diagram illustrating the functional structure of the detection conditions distribution server 50. As shown in FIG. 7, the detection conditions distribution server 50 functionally includes: a detection conditions storage unit 51; a request-for-acquisition-of-detection-conditions processing unit 52; a detection conditions control unit (the second detected mail processing control means and the second detection conditions application control means) 53; and a new detection conditions receiving unit 54. Hereinafter, these functional components will be described in detail.

The detection conditions storage unit 51 is a database in which the above-described plurality of pieces of detection condition data are stored. The detection condition data stored in this detection conditions storage unit 51 will be described with reference to FIG. 8. FIG. 8 illustrates a storage format by which the detection conditions storage unit 51 stores the detection condition data. One row of data shown in FIG. 8 is the detection condition data and a plurality of pieces of such detection condition data are stored in the detection conditions storage unit 51. These detection condition data include letter strings and category information, respectively. Hereinafter, these pieces of information will be described.

First, a letter string included in the detection condition data is a keyword used for a processing by the mobile communication terminal 10 for detecting a mail. A mail including information conforming to this keyword is detected by the mobile communication terminal 10. In FIG. 8, "advertisement", "notification" or the like are a letter strings working as keywords. The letter string is also associated with category information representing each category. This category information represents the type of a mail including a letter string conforming to a letter string associated therewith. Specifically, a mail which conforms to a letter string such as "advertisement" or "notification" belonging to the category of "advertisement" is detected as one belonging to "advertisement". Similarly, a mail which conforms to a letter string such as "sexy" or "married woman" belonging to the category of "adult" is detected as belonging to "adult". Note that there are other pieces of category information such as "violence".

Figure 2:
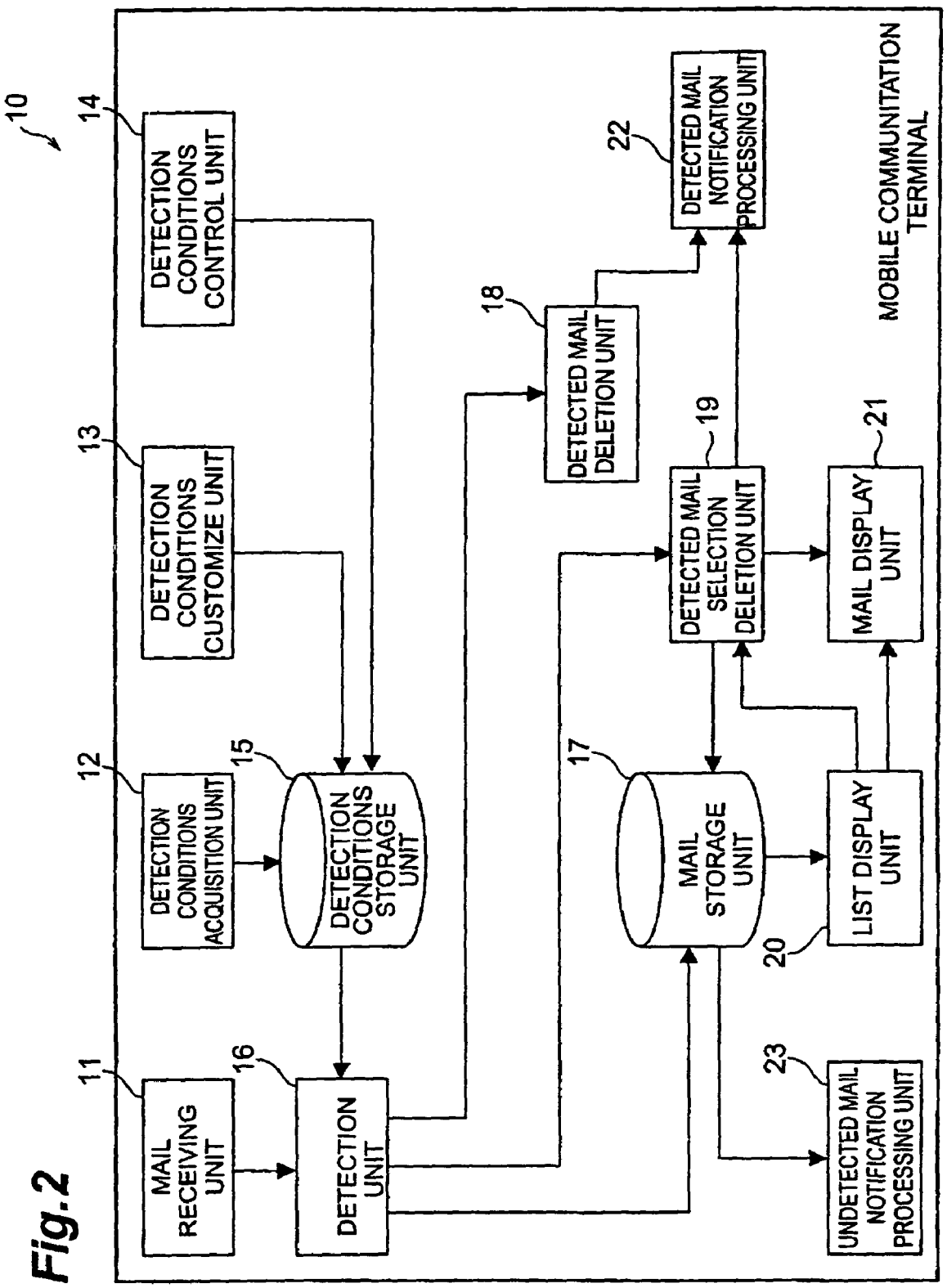
FIG. 2 is a block diagram illustrating a functional configuration of a mobile communication terminal according to an embodiment.

Back to FIG. 2, the detection conditions control unit 53 associates, based on category information, distribution processing information, and information for the application of detection conditions specified by each of the administrators of a plurality of the mobile communication terminal 10, distribution processing information and information for the application of detection conditions with category information for each of the mobile communication terminals 10, thereby storing the associated information in the detection conditions storage unit 51 for control. When the administrator of the mobile communication terminal 10 specifies the category information, the distribution processing information, and the information for the application of detection conditions as described above, then these pieces of information are sent to the mobile communication terminals 10 controlled by each of the administrators. Here, the storage format of these pieces of information stored in the detection conditions storage unit 51 is illustrated. As shown in FIG. 9, the detection conditions storage unit 51 stores, in addition to the above-described detection condition data, stored distribution processing information associated with category information for each of the mobile communication terminals 10 (in FIG. 9 the terminals A, B . . . N respectively represents the mobile communication terminals 10 owned by a plurality of users) and information for the application of detection conditions. When detection condition data are downloaded to each of the mobile communication terminals 10 and a mail including a letter string conforming to the letter string included in the detection condition data is detected by a mobile communication terminal 10 and the distribution processing information is "1", then the mail is automatically deleted. If the distribution processing information is "2", then a display is provided for prompting a user to select whether to delete the mail or not. The information for the application of detection conditions is information which specifies, whether or not the application of a letter string included in the detection condition data is indispensable for the processing for detecting a mail by the mobile communication terminal 10 when detection condition data are downloaded to each of the mobile communication terminals 10. When the information for the application of detection conditions is "1", the application of the letter string is indispensable and when information for the application of detection conditions is "2", a user of the mobile communication terminal 10 can specify whether the letter string application is required or not. These distribution processing information and information for the application of detection conditions are used in a case where a child is allowed to use the mobile communication terminal 10 as a user, for example. In such a case, a parent who is the administrator of the child specifies whether or not a letter string included in detection condition data downloaded to the mobile communication terminal 10 should be applied for the mail detection or whether or not a mail extracted by the letter string should be automatically deleted.

In accordance with a request for acquisition and processing of detection condition data from the mobile communication terminal 10, the request-for-acquisition-of-detection-conditions processing unit 52 takes detection condition data from the detection conditions storage unit 51 and sends the data to the mobile communication terminal 10. In this processing, when a request for acquisition of detection conditions is sent together with the category information from the mobile communication terminal 10, then detection condition data including a letter string associated with the category information is sent to the mobile communication terminal 10.

The new detection conditions receiving unit 54 receives a new letter string sent from the new pattern receiving server 60 and stores detection condition data including this letter string in the detection conditions storage unit 51. Details of the new pattern receiving server 60 will be described later.

Next, the mobile communication terminal 10 will be described. The mobile communication terminal 10 is an information terminal capable of receiving and sending a mail (e.g., mobile phone or mobile information terminal) The mobile communication terminal 10 includes: a central processing unit (CPU); a memory device (e.g., memory); a communication device used for mail transmission and receiving; an input device (e.g., button); a display device (e.g., display); or the like.

Next, functional structure of this mobile communication terminal 10 will be described. FIG. 2 is a block diagram illustrating the functional structure of the mobile communication terminal 10. As shown in FIG. 2, the mobile communication terminal 10 is structured to include: a mail receiving unit (mail receiving means) 11; a detection conditions acquisition unit (detection conditions acquisition means) 12; a detection conditions customize unit (detection conditions additional registration means) 13; a detection conditions control unit (detected mail processing information acquisition means, detection condition application information acquisition means, detection conditions selection control means) 14; a detection conditions storage unit (detection conditions storage means) 15; a detection unit (detection means) 16; a mail storage unit 17; a detected mail deletion unit (detected mail deletion means) 18; a detected mail selection deletion unit (detected mail selection deletion means) 19; a list display unit (list display means) 20; a mail display unit 21; a detected mail notification processing unit (detected mail notification processing means) 22; and an undetected mail notification processing unit 23.

The mail receiving unit 11 receives from the mail server 40 a mail sent from a mail sender to the mobile communication terminal 10. Then, the mail receiving unit 11 outputs the received mail to the detection unit 16.

The detection conditions acquisition unit 12 acquires detection condition data from the detection conditions distribution server 50. Specifically, the detection conditions acquisition unit 12 sends a request for the acquisition of detection condition data to the detection conditions distribution server 50 and then receives detection condition data sent, based on the above transmission, from the detection conditions distribution server 50. Then, the detection conditions acquisition unit 12 stores the acquired detection condition data in the detection conditions storage unit 15. The detection conditions acquisition unit 12 performs this processing for acquiring from the detection conditions distribution server 50 the detection condition data on a regular basis and also performs this processing when a user instructs to do so. When a user specifies a piece of category information, then the detection conditions acquisition unit 12 sends to the detection conditions distribution server 50 a request for the acquisition of detection condition data together with this category information. In this case, the detection conditions distribution server 50 sends detection condition data including this category information.

The detection conditions customize unit 13 adds to and registers in the detection conditions storage unit 15 the detection condition data including a letter string inputted by a user of the mobile communication terminal 10. The detection unit 16 which will be described later performs a processing for detecting a mail including such additionally registered detection condition data.

The detection conditions control unit 14 acquires distribution processing information and information for the application of detection conditions associated with category information sent from the detection conditions distribution server 50. Then, the detection conditions control unit 14 adds the distribution processing information and the information for the application of detection conditions to detection condition data including the category information among detection condition data stored in the detection conditions storage unit 15. When a user can select whether or not to apply a letter string included in the detection condition data to the detection processing as the information for the application of detection conditions, then selection information representing whether or not the user of the mobile communication terminal 10 selects the application of the detection processing is added to the detection condition data.

The detection conditions storage unit 15 stores the detection condition data acquired by the detection conditions acquisition unit 12. The detection conditions storage unit 15 also stores the above described distribution processing information and the information for the application of detection conditions added by the detection conditions control unit 14 to be included in the detection condition data. FIG. 3 shows the detection condition data stored in the detection conditions storage unit 15. As shown in FIG. 3, the detection conditions storage unit 15 stores a plurality of pieces of detection condition data acquired by the detection conditions acquisition unit 12 from the detection conditions distribution server 50. One row of data shown in FIG. 3 represents one datum for detection conditions. These detection condition data include the above described letter string and category information representing the category of the letter string. Furthermore, each of pieces of detection condition data is added with the above-described distribution processing information, information for the application of detection conditions, and the selection information. The distribution processing information and the information for the application of detection conditions are those which have been registered for each category in the detection conditions distribution server 50 and sent therefrom as described above. When this distribution processing information is "1", then a mail which is extracted by a letter string included in the detection condition data to which this distribution processing information is added is automatically deleted by the detected mail deletion unit 18 which will be described later. When the distribution processing information is "2", then the detected mail selection deletion unit 19 which will be described later performs a display for prompting a user to select whether or not to delete the mail with regards to a mail detected by a letter string included in the detection condition data to which this distribution processing information is added. If the information for the application of detection conditions is "1", then application of a letter string included in the detection condition data, to which the information for the application of detection conditions is added, to a mail detection processing by the detection unit 16 is indispensable. If the information for the application of detection conditions is "2", then a user of the mobile communication terminal 10 can specify whether or not to apply the letter string included in the detection condition data to which this information for the application of detection conditions is added. When the information for the application of detection conditions is "2" that is, when a user of the mobile communication terminal 10 can specify whether or not to apply the letter string included in the detection condition data to which this information for the application of detection conditions is added, if the selection information of "1" represents that the user selected to allow the letter string to be applied to the processing and the selection information of "2" represents that the user selected not to allow the letter string to be applied to the processing.

Back to FIG. 2, the detection unit 16 acquires a plurality of pieces of detection condition data stored in the detection conditions storage unit 15 and performs a detection processing for extracting whether or not a mail outputted from the mail receiving unit 11 includes a letter string conforming to these letter string included in the detection condition data. In this processing, the detection unit 16 refers to the information for the application of detection conditions added to the detection condition data and, when the information for the application of detection conditions is set as "1", then the detection unit 16 uses the letter string included in the detection condition data for the detection processing. When the detection unit 16 refers to the information for the application of detection conditions and the information for the application of detection conditions is set as "2", then the detection unit 16 refers to the selection information added to the detection condition data. Then, when "1" is selected, then the detection unit 16 uses the letter string included in the detection condition data for the mail detection processing performed by the detection unit 16. For example, in the case of the detection condition data shown in the first row of FIG. 3, the information for the application of detection conditions is "2" and the reference to the selection information shows that the selection information is "1". In this case, the letter string included in the detection condition data is applied to the detection processing. On the other hand, in the case of the detection condition data shown in the second row of FIG. 3, since the selection information is "2", the letter string included in the detection condition data is not applied to the detection processing.

Back to FIG. 2, when a mail is extracted by the detection processing, the detection unit 16 refers to distribution processing information added to detection condition data including a letter string conforming to a letter string included in the mail. If the distribution processing information is "1", then the detection unit 16 outputs the mail to the detected mail deletion unit 18. If the distribution processing information is "2", on the other hand, then the detection unit 16 outputs the mail to the detected mail selection deletion unit 19. For example, when a mail that includes a letter string conforming to "advertisement" which is a letter string included in the detection condition data shown in the first row of FIG. 3 is detected, then the distribution processing information is "2" and thus the mail is outputted to the detected mail selection deletion unit 19. When a mail that includes information conforming to "sexy" which is a letter string included in the detection condition data shown in the fourth row of FIG. 3 is detected, then the distribution processing information is "1" and thus the mail is outputted to the detected mail deletion unit 18.

Back to FIG. 2, the mail storage unit 17 stores such a mail that has not been extracted by the detection unit 16 because of the non-inclusion of information conforming to any letter string. The mail storage unit 17 also stores a mail in the case where a mail which has been extracted by the detection unit 16 is outputted to the detected mail selection deletion unit 19 and a user does not select the deletion of the mail in response to the display by the detected mail selection deletion unit 19. FIG. 4 shows the storage format of a mail stored in the mail storage unit 27. One row of data shown in FIG. 4 represents the stored data for a mail and "A, B, C . . . " in the column of "mail" represents the data of each mail. The "detection result information" is information which represents whether each of the mails is the one extracted by the detection unit 16. If "detection result information" is "0", then it represents that the mail has not been extracted by the detection processing by the detection unit 16. If "detection result information" is "1", then it represents the mail which has been extracted by a letter string having a category of "advertisement". Hereinafter, "detection result information" of "2" represents the mail which has been extracted by a letter string having a category of "adult" and "detection result information" of "3" represents the mail which has been extracted by a letter string having a category of "violence". Furthermore, "already-read flag" is information representing whether or not the mail has already been read by a user. The "already-read flag" of "0" represents "unread" and "already-read flag" of "1" represents "already read".

Back to FIG. 2, the detected mail deletion unit 18 automatically deletes the mail outputted from the detection unit 16. Then, the detected mail deletion unit 18 outputs to the detected mail notification processing unit 22 the information regarding the deleted mail. Details of this output to the detected mail notification processing unit 22 will be described later.

Figure 5:
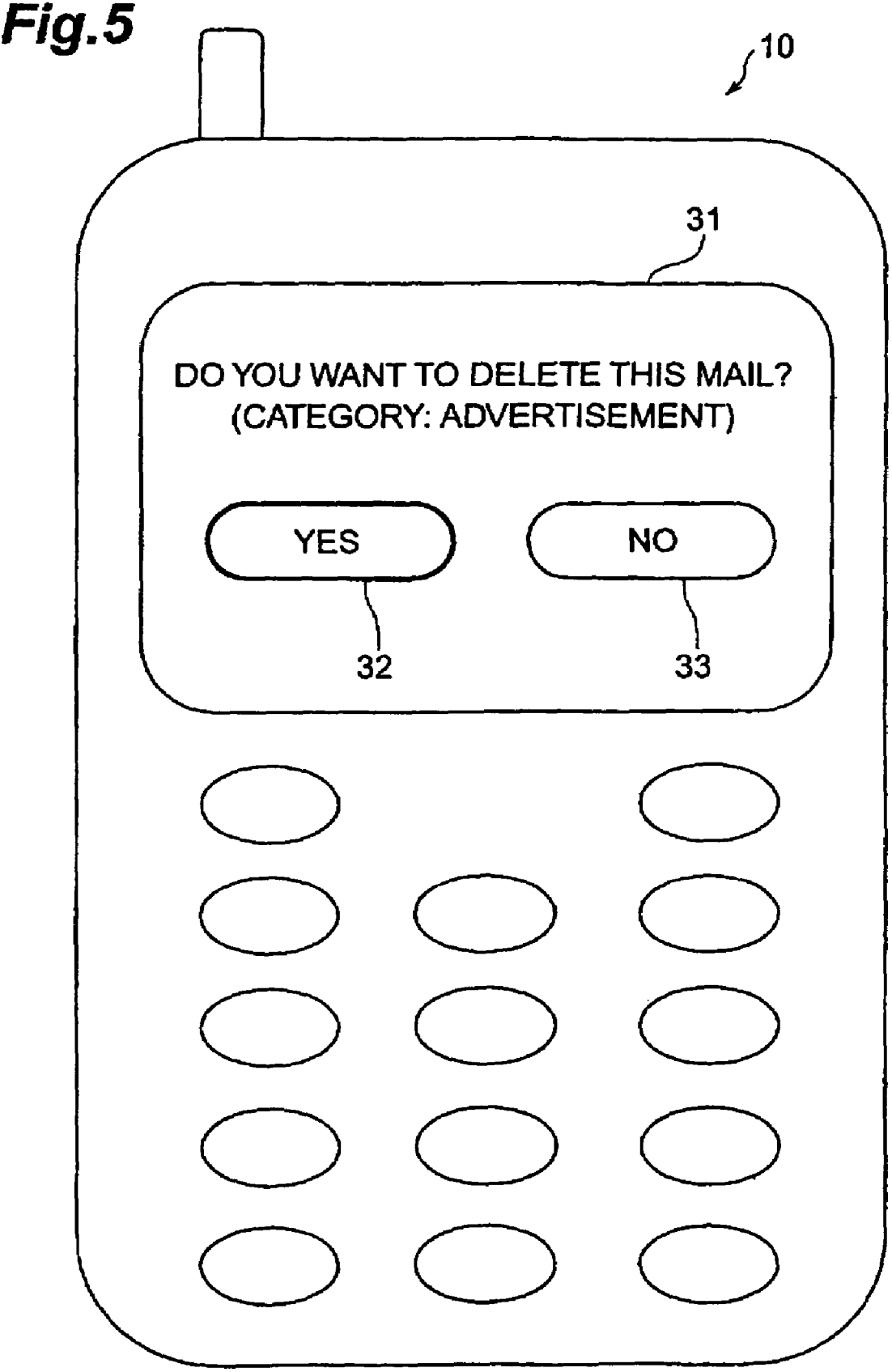
FIG. 5 is a view showing an example of a screen displayed by a detected mail selection deletion section of the mobile communication terminal of the embodiment.

The detected mail selection deletion unit 19 provides a display for prompting a user to select whether or not to delete the mail outputted from the detection unit 16 and based on the selection by the user in response to this display, deletes the mail. When the user tries to view a mail which has been extracted by the detection unit 16 from among the mails stored in the mail storage unit 17, the detected mail selection deletion unit 19 also performs a display for prompting the user to select whether or not to delete the mail based on the selection by the user in response to this display. FIG. 5 illustrates an exemplary screen displayed by this detected mail selection deletion unit 19 on the display 31 of the mobile communication terminal 10. As shown in FIG. 5, the detected mail selection deletion unit 19 displays an inquiry for asking whether to delete the mail or not when a mail extracted by the detection unit 16 is directly outputted or when a user tries to view the mail extracted by the detection unit 16 among mails stored in the mail storage unit 17. In this processing, as shown in FIG. 5, when the mail is detected by the detection unit 16, then the detected mail selection deletion unit 19 also allows to display category information representing the category of a letter string included in the detection condition data conforming to a letter string included in the mail. Then the detected mail selection deletion unit 19 displays "delete" icon 32 to be selected by a user when the mail is deleted and "not delete" icon 33 selected by a user when the mail is not to be deleted. When the user selects "delete" icon 32 in response to this display, then the detected mail selection deletion unit 19 deletes the mail. In this processing, when the reference to "already-read flag" of the mail stored in the mail storage unit 17 shows that "already-read flag" is "0", then the information regarding the mail is outputted to the detected mail notification processing unit 22. When "not delete" icon 33 is selected on the other hand, then the mail is not deleted. When the mail is not deleted and the mail has been directly outputted from the detection unit 16, then the mail is stored in the mail storage unit 17. On the other hand, when a user tries to view a mail stored in the mail storage unit 17 and the mail is the one extracted by the detection unit 16 and the user selects not to delete the mail, then the mail is outputted to the mail display unit 21 and the contents of the mail is displayed on the display 31. In this processing, when the mail is an unread mail, then "already-read flag" associated with data of the mail in the mail storage unit 17 is specified as "1" (which represents "already-read").

The list display unit 20 displays the list of the titles of a plurality of mails stored in the mail storage unit 17. Note that information to be displayed in the list does not have to be the titles of mails and maybe information by which various mails can be identified. For example, sender addresses may be displayed as information in the list. The list display unit 20 displays, when displaying a list, mails extracted by the detection unit 16 together with information representing the category of a letter string included in the detection condition data which conforms to a letter string included in the mail in the detection processing. The category displayed in this list is acquired by referring to detection result information associated with each mail datum stored in the mail storage unit 17. FIG. 6 illustrates the screen of a list displayed by the list display unit 20 on the display 31. As shown in FIG. 6, the screen displayed by the list display unit 20 displays the titles of mails. If "1" is displayed beside a mail title, it shows that the mail is the one which has been extracted by a letter string belonging to the 3 category of "advertisement". If "2" displayed beside a mail title, it shows that the mail is the one which has been extracted by a letter string belonging to category of "adult".

Back to FIG. 2, when a mail selected by a user as the one to be displayed on the display 31 from those in the list displayed by the list display unit 20 is a mail extracted by the detection unit 16, then the list display unit 20 outputs the mail to the detected mail selection deletion unit 19. When the mail is not the one extracted by the detection unit 16 on the other hand, then the list display unit 20 outputs the mail to the mail display unit 21.

The mail display unit 21 displays on the display 31 the contents of the mail outputted from the list display unit 20.

The detected mail notification processing unit 22 sends, with regards to an unread mail which has been deleted by the detected mail deletion unit 18 or the detected mail selection deletion unit 19, the information regarding the mail to the detected mail notification receiving server 70. The information regarding the mail includes a notification that the mail has been extracted by the detection unit 16 and the amount of packets of the mail. This information regarding the mail is received by the detected mail notification receiving server 70. The detected mail notification receiving server 70 instructs the billing control server 80 to perform, based on the packet amount, a processing for reducing the communication charge and then, the billing control server 80 performs the processing for reducing the communication charge. After mails which have been extracted by the detection unit 16 are accumulated to a predetermined level, the detected mail notification processing unit 22 performs a processing for sending the above-described information regarding the mail to the detected mail notification receiving server 70. This "predetermined level" may be a regular timing such as a monthly basis or may be the one at which mails extracted by the detection unit 16 reaches a certain number.

The detected mail notification processing unit 22 sends a notification to the detected mail notification receiving server 70 as described above, thereby calculating the communication charge to be returned and displaying on the display 31 the communication charge to be returned.

When a mail is not extracted by the detection unit 16 but is determined by a user as the one to be extracted, then the undetected mail notification processing unit 23 sends this mail to the new pattern receiving server 60. On receiving the mail, the new pattern receiving server 60 takes a new letter string included in the mail and sends the new letter string to the detection conditions distribution server 50.

Figure 10:
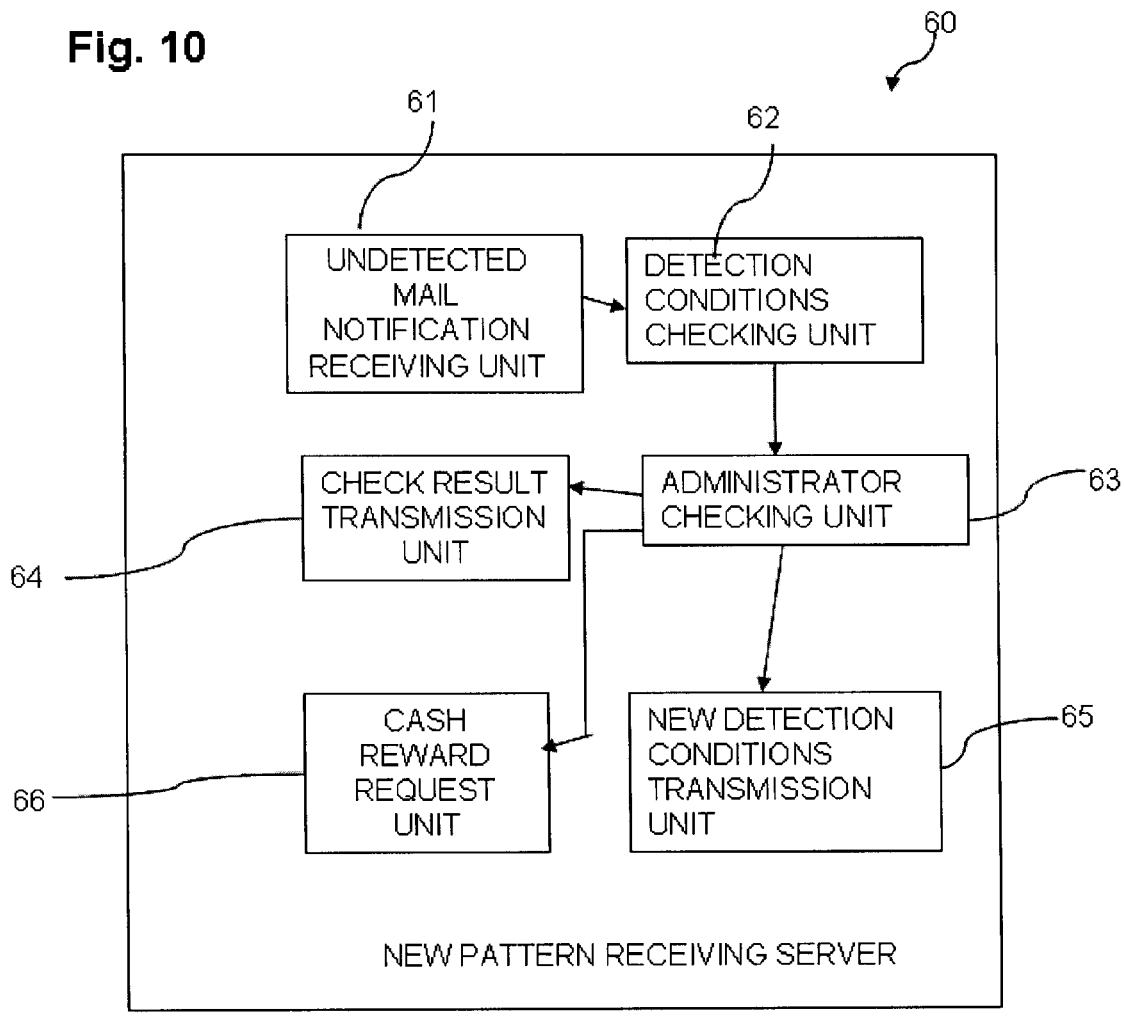
FIG. 10 is a block diagram illustrating a functional configuration of a new pattern receiving server according to an embodiment.

Next, the new pattern receiving server 60 will be described in detail. The new pattern receiving server 60 physically includes: a central processing unit (CPU); a memory device (e.g., memory); a storage device (e.g., hard disc); a display device (e.g., display); an input device (e.g., keyboard); the mobile communication terminal 10; the detection conditions distribution server 50; and a communication device used for the communication with the billing control server 80. The new pattern receiving server 60 is structured to include, as shown in the block diagram of FIG. 10 illustrating the functional structure of the new pattern receiving server 60, an undetected mail notification receiving unit 61; a detection conditions checking unit 62; an administrator checking unit 63; a check result transmission unit 64; a new detection conditions transmission unit 65; and a cash reward request unit 66. Hereinafter, these constituent components will be described in detail.

The undetected mail notification receiving unit 61 receives a mail sent from the undetected mail notification processing unit 23 of the mobile communication terminal 10 and then outputs this mail to the detection conditions checking unit 62.

The detection conditions checking unit 62 extracts, from among the mails outputted from the undetected mail notification receiving unit 61, candidates of new letter strings to be included in the detection condition data (hereinafter referred to as "pattern"). Then, the detection conditions checking unit 62 compares the extracted patterns with already-registered letter strings included in all pieces of detection condition data which have been stored in the detection conditions storage unit 51 of the detection conditions distribution server 50, thereby outputting those patterns not conforming to all of the already-registered letter strings to the administrator checking unit 63.

By the check by the administrator, the administrator checking unit 63 detects, from among the patterns outputted from the detection conditions checking unit 62, those consisting of letter strings to be newly included in the detection condition data. Then, the administrator checking unit 63 outputs the pattern thus extracted as a new letter string to the new detection conditions transmission unit 65. Then, the new detection conditions transmission unit 65 sends this new letter string to the detection conditions distribution server 50.

The check result transmission unit 64 sends, to the mobile communication terminal 10 which has sent a mail to this new pattern receiving server 60, the processing result including: the result showing whether or not a letter string to be newly registered and included in the detection condition data was extracted from the mail; and the result regarding the allocation of cash reward by the cash reward request unit 66 which will be described later.

When the administrator checking unit 63 extracts a letter string to be newly included in the detection condition data, then the cash reward request unit 66 sends, in order to allocate cash reward to the mobile communication terminal 10 which has sent the mail from which the letter string was extracted, a request for the payment of the cash reward to the billing control server 80. Then, the billing control server 80 performs a processing for reducing a communication charge equivalent to the cash reward from the communication charge to the mobile communication terminal 10. Then, the information regarding this processing result is sent from the billing control server 80 to the cash reward request unit 66 and the cash reward request unit 66 sends the received processing result to the mobile communication terminal 10.

Figure 11:
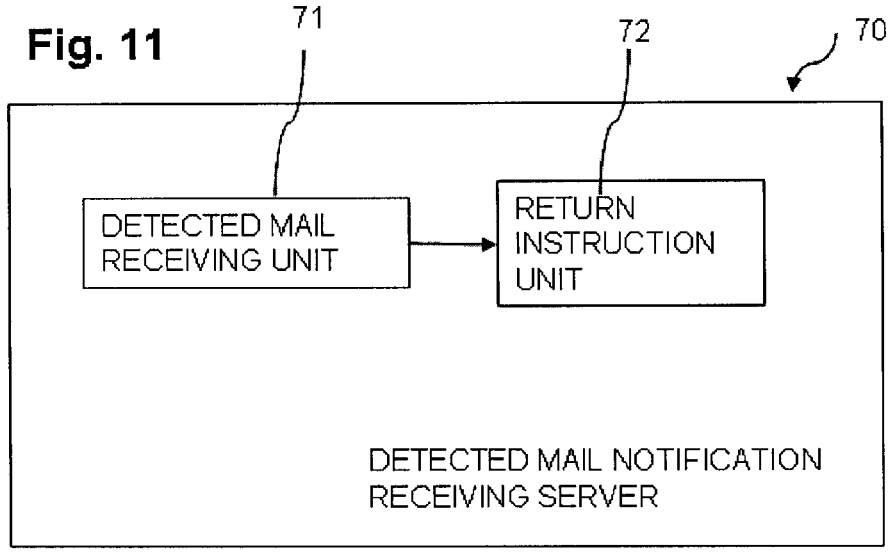
FIG. 11 is a block diagram illustrating a functional configuration of a detected mail notification receiving server according to an embodiment.

Next, the detected mail notification receiving server 70 will be described in detail. The detected mail notification receiving server 70 physically includes: a central processing unit (CPU); a memory device (e.g., memory): a storage device (e.g., hard disk); a display device (e.g., display); an input device (e.g., keyboard); the mobile communication terminal 10; and a communication device used for the communication with the billing control server 80. The detected mail notification receiving server 70 is structure to include, as shown in the block diagram of FIG. 11 illustrating the functional structure, a detected mail receiving unit (detected mail receiving means) 71; and a return instruction unit (communication charge return instruction means) 72. Hereinafter, these constituent components will be described.

The detected mail receiving unit 71 receives the information regarding the mail sent from the detected mail notification processing unit 22 of the mobile communication terminal 10. Specifically, the detected mail receiving unit 71 receives from the mobile communication terminal 10 the notification information that the mail has been extracted by the detection unit 16 of the mobile communication terminal 10 and the number of packets in the mail. Then, the detected mail receiving unit 71 receives these pieces of information and outputs these pieces of information to the return instruction unit 72.

The return instruction unit 72 calculates, based on the number of packets included in the information regarding the mail outputted from the detected mail receiving unit 71, a communication charge to be returned. Then, the processing for reducing the communication charge to the mobile communication terminal 10 which received the mail is performed. When the result of the processing for reducing the communication charge, that is, the completion of returning the communication charge, is sent from the billing control server 80 to the detected mail notification receiving server 70, the return instruction unit 72 receives the result of the processing. Simultaneously, the return instruction unit 72 sends the result of returning the communication charge including the result of the processing to the mobile communication terminal 10 which has sent the mail.

Next, the billing control server 80 will be described. The billing control server 80 is a computer system for controlling the communication charge for the mobile communication terminal 10. The billing control server 80 performs the processing for reducing the communication charge instructed by the detected mail notification receiving server 70 and sends the processing result to the detected mail notification receiving server 70. The billing control server 80 also performs the processing of the request for the payment of the cash reward requested by the new pattern receiving server 60 and sends the processing result to the new pattern receiving server 60.

Hereinafter, how the mail detection system 1 according to the present embodiment operates will be described. Simulataneously The method for detecting mail according to the present embodiment will be described. FIGS. 12 to 16 illustrate a flowchart of the method for detecting mail according to the present embodiment. In the following sections, description is made on the assumption that the detection condition data have been already acquired by the detection conditions acquisition unit 12 from the detection conditions distribution server 50.

Figure 12:
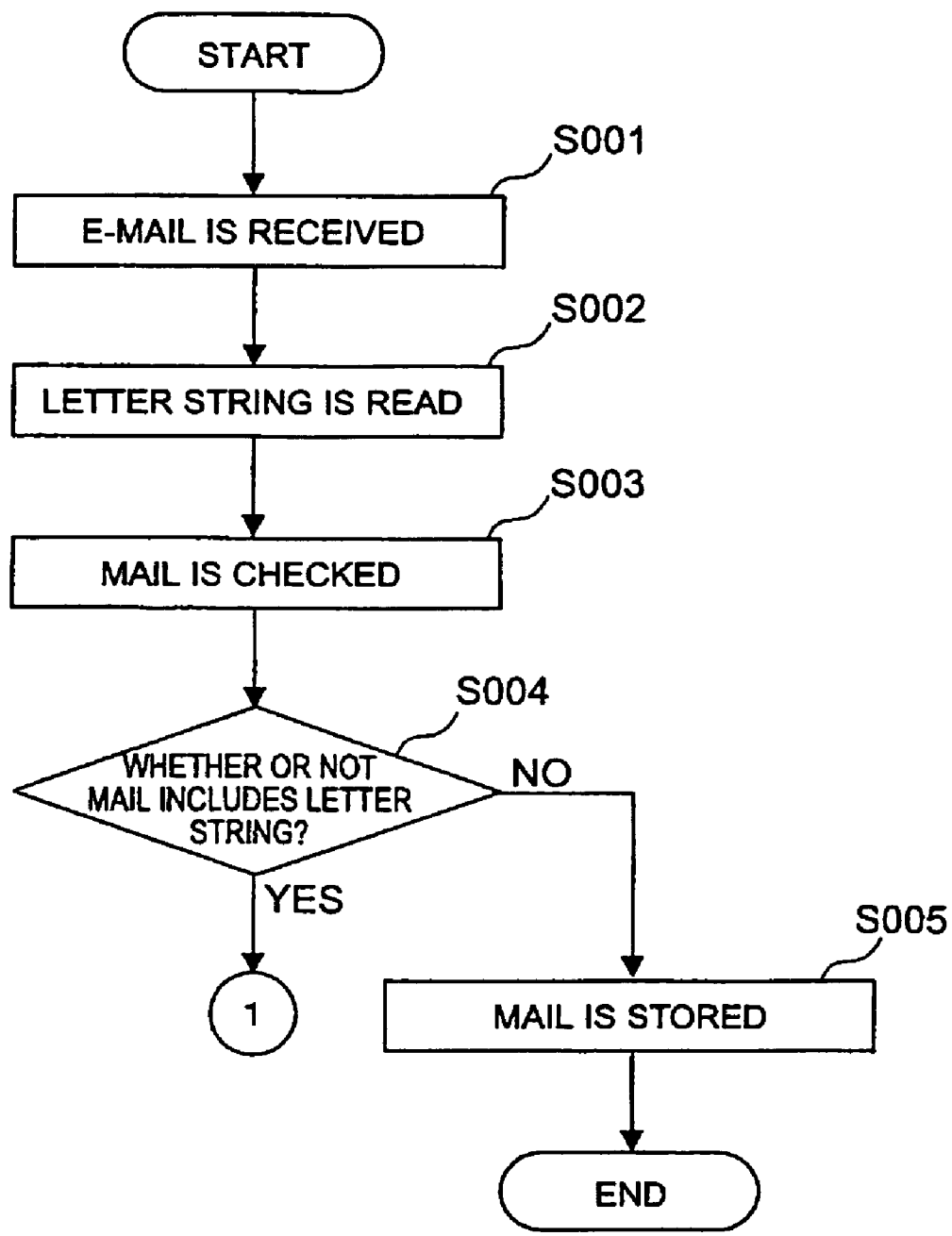
FIG. 12 is a flowchart of a method for detecting mail according to an embodiment.

First, in the method for detecting mail according to the present embodiment, the mail receiving unit 11 of the mobile communication terminal 10 receives a mail from the mail server 40, as shown in FIG. 12 (Step S001). Thereafter, when the mail received by the mail receiving unit 11 is outputted to the detection unit 16, the detection unit 16 reads letter strings included in the detection condition data stored in the detection conditions storage unit 15 (Step S002). In this processing, the read letter strings include: the one which is specified by the administrator of the mobile communication terminal 10 as being always indispensable for application to the detection processing; and the one which is specified by the administrator of the mobile communication terminal 10 to allow a user select whether the letter string is applied to the detection processing or not and the user is allowed to determine the application of the detection processing. Next, the detection unit 16 checks whether the mail outputted from the mail receiving unit 11 includes the above-mentioned read letter string or not (Step S003). Then, the detection unit 16 determines whether the mail includes the letter string or not (Step S004). If the mail does not include the letter string, then the detection unit 16 stores the mail in the mail storage unit 17. If the mail includes the letter string on the other hand, then the detection unit 16 outputs the mail to the detected mail selection deletion unit 19 to subject the mail to the processing shown in the flowchart of FIG. 13. Note that there may be a case in which, depending on the category of the letter string included in the detection condition data, the administrator of the mobile communication terminal 10 specifies that the mails extracted by the detection unit 16 as those to be outputted to the detected mail deletion unit 18 for the processing. However, this embodiment illustrates a case in which the mails detected by the detection unit 16 are outputted to the detected mail selection deletion unit 19.

Figure 13:
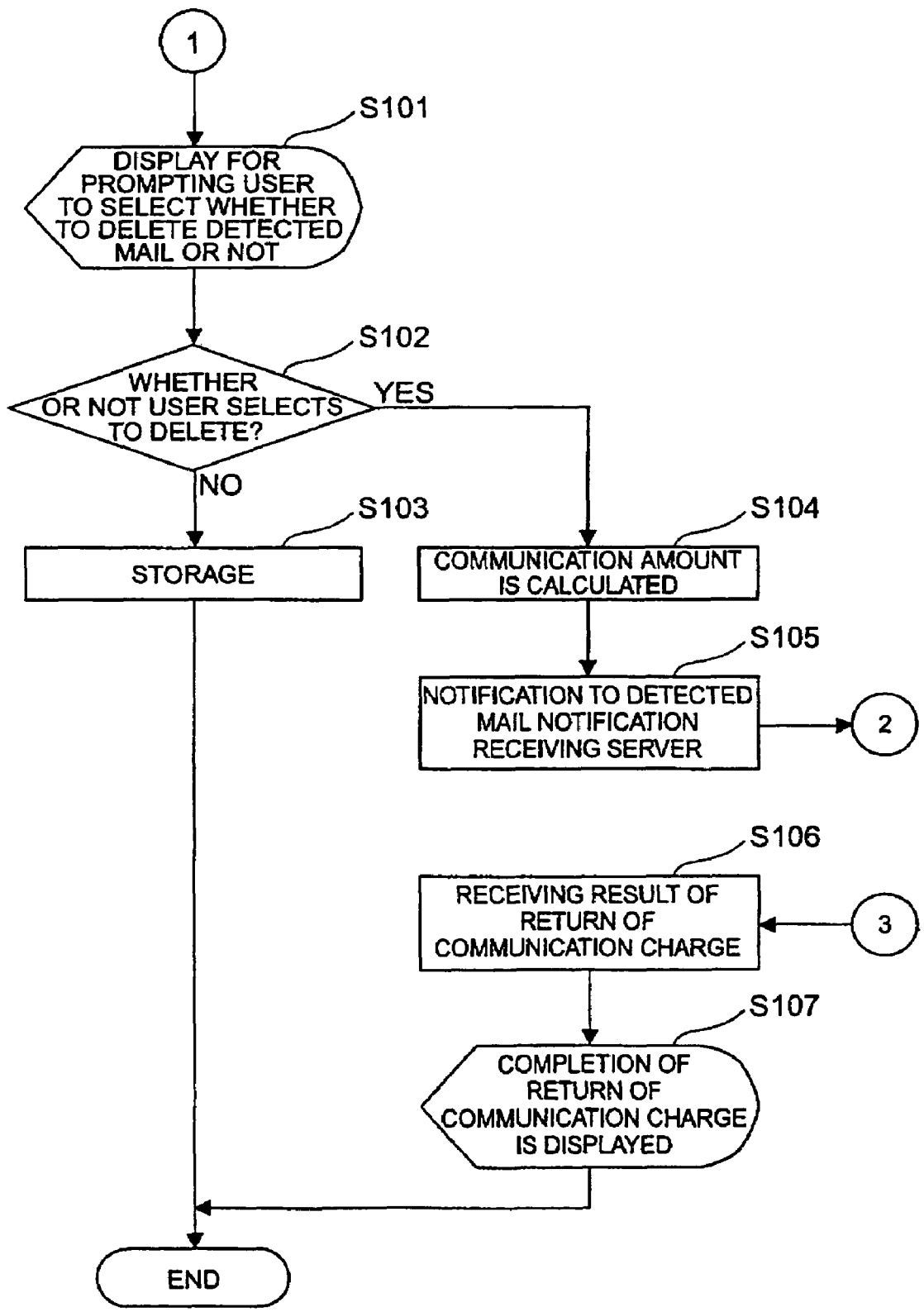
FIG. 13 is a flowchart of a method for detecting mail according to an embodiment.

Next, as shown in FIG. 13, when a mail is outputted from the detection unit 16, then the detected mail selection deletion unit 19 displays on the display 31 a display for prompting a user to select whether to delete the mail or not (Step S101). Then, in response to the display by the detected mail selection deletion unit 19, the user determines whether to delete the mail or not (Step S102). In this processing, when the user selects "not delete" icon 33, then the mail is stored in the mail storage unit 17 (Step S103). When the user selects "delete" icon 32 on the other hand, then the detected mail notification processing unit 22 calculates the communication amount of the mail and the detected mail selection deletion unit 19 deletes the mail (Step S104). Then, the detected mail notification processing unit 22 notifies of the detected mail notification receiving server 70 the above communication amount and a notification that the mail has been extracted by the detection unit 16 (Step S105).

Figure 14:
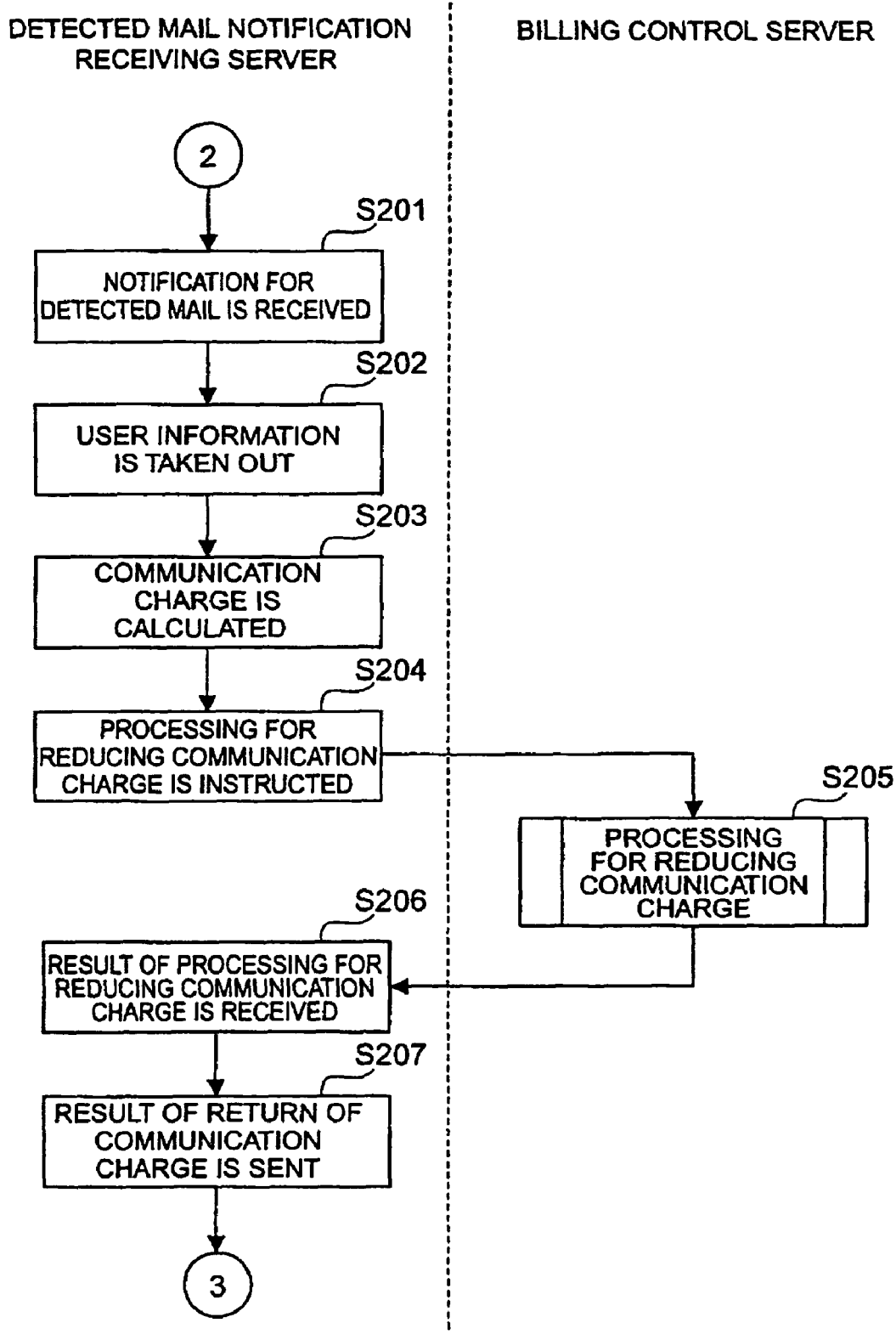
FIG. 14 is a flowchart of a method for detecting mail according to an embodiment.

As described above, when the detected mail notification processing unit 22 sends the notification to the detected mail notification receiving server 70, then the detected mail receiving unit 71 of the detected mail notification receiving server 70 receives the information notified by the detected mail notification processing unit 22 to output the received information to the return instruction unit 72, as shown in FIG. 14 (Step S201). Then the return instruction unit 72 takes the user information of the mobile communication terminal 10 which has provided this notification (Step S202). Next, the communication charge of the mail is calculated based on the communication amount included in the information received by the return instruction unit 72 in a manner as described above (Step S203). Then, in order to return this communication charge, the return instruction unit 72 sends to the billing control server 80 and instruction information for instructing the billing control server 80 to perform the processing for reducing this communication charge by the amount that includes the user information (Step S204). Then, the billing control server 80 receives the instruction information sent from the return instruction unit 72 to perform the reduction processing for reducing the communication charge included in the instruction information from the currently-billed amount which is associated with the user information included in this instruction information for control. Then, the billing control server 80 sends the result of the reduction processing to the detected mail notification receiving server 70 (Step S205) The detected mail notification receiving server 70 receives the processing result of the reduction sent from the billing control server 80 (Step S206) to send the result of the return of the communication charge including the result of this reduction processing to the mobile communication terminal 10 which has sent the information regarding the mail detected by the detection unit 16 (Step S207).

Back to FIG. 13, the result of the return of the communication charge sent from the detected mail notification receiving server 70 is received by the detected mail notification processing unit 22 of the mobile communication terminal 10 (Step S106). On receiving this result of the return of the communication charge, the detected mail notification processing unit 22 provides a display on the display 31 in order to notify user the completion of return of the communication charge (Step S107).

Figure 15:
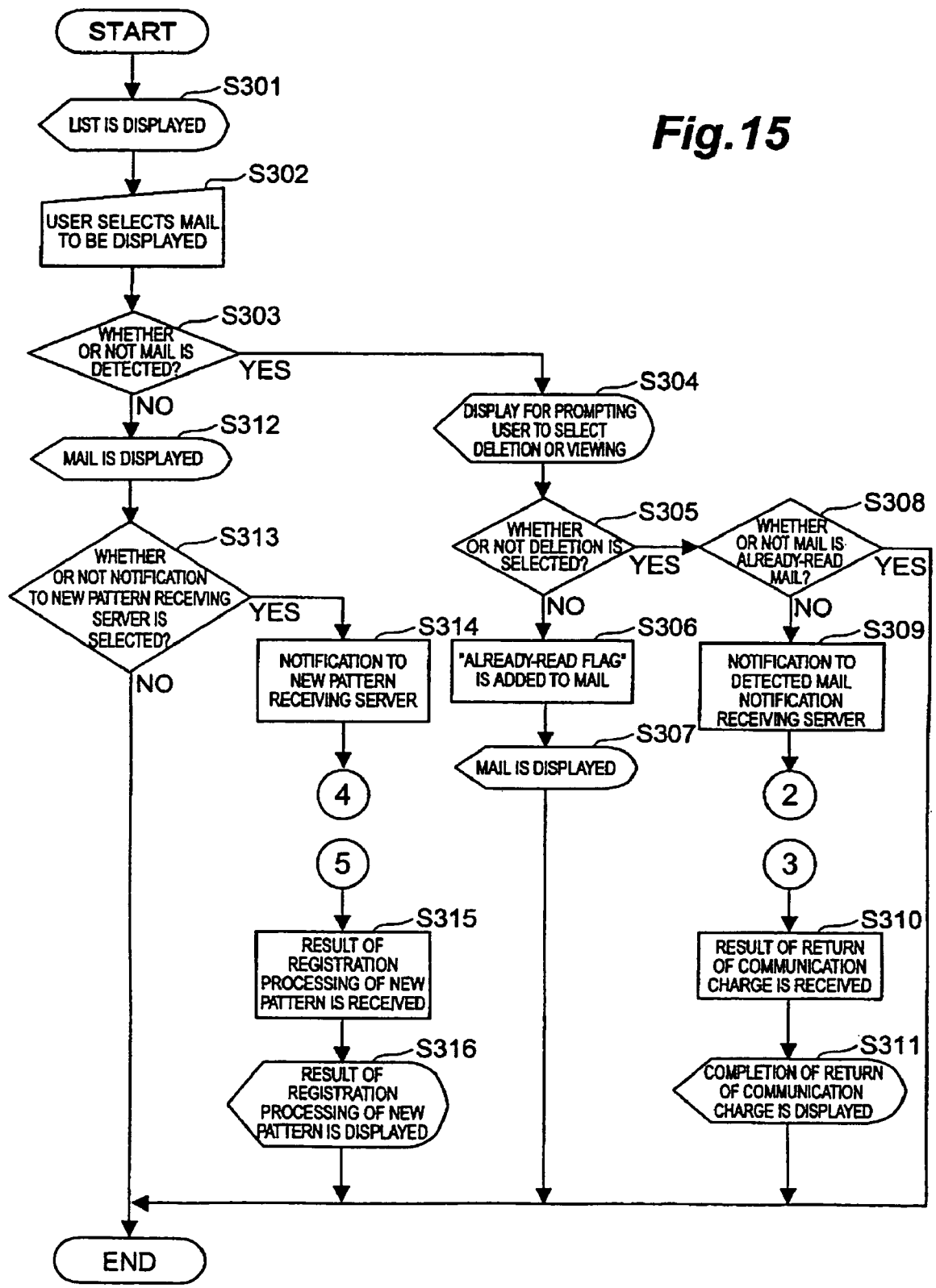
FIG. 15 is a flowchart of a method for detecting mail according to an embodiment.

Next, a processing will be described for a case where a user of the mobile communication terminal 10 tries to view the received mail. As shown in FIG. 15, when a user tries to view the mail, a list of mails stored in the mail storage unit 17 is displayed by the list display unit 20 on the display 31 (Step S301). In this processing, the display 31 displays the list of mails by the titles of the mails, for example. When the user selects from among the displayed list a mail which is desired to be views by the user, then the list display unit 20 decides whether or not the mail is the one extracted by the detection unit 16 (Step S303). In this processing, when the mail is the one extracted by the detection unit 16, then the list display unit 20 outputs the mail to the detected mail selection deletion unit 19. When the mail is outputted from the list display unit 20, the detected mail selection deletion unit 19 provides a display for prompting a user to select whether to delete the mail or not (Step S304). The detected mail selection deletion unit 19 determines the selection by the user for this display (Step S305) and, when the user decides not to delete the mail, the detected mail selection deletion unit 19 adds "1" to the already-read flag of the mail stored in then the mail storage unit 17 for notifying that the mail has been already read (Step S306). Then, the detected mail selection deletion unit 19 outputs the sail to the mail display unit 21 and the mail display unit 21 displays the mail on the display 31 (Step S307).

On the other hand, when the user makes a decision in response to the display by the detected mail selection deletion unit 19 (Step S305) and the user selects to delete the mail, then whether the mail is an already-read mail or not is confirmed (Step S308). If the mail is an already-read mail, then the mail is deleted and the processing is completed. On the other hand, if the mail is an unread mail, then the detected mail notification processing unit 22 calculates the communication amount of the mail to notify of the detected mail notification receiving server 70 the communication amount and a notification that the mail has been detected by the detection unit 16. Simultaneously, the detected mail selection deletion unit 19 deletes the mail from the mail storage unit 17 (Step S309). Then, the processing of the above described Steps S201 to S207 shown in FIG. 14 is performed by the detected mail notification receiving server 70 and the billing control server 80. Then, the above-described result of the return of the communication charge sent from the detected mail notification receiving server 70 is received by the detected mail notification processing unit 22 (Step S310), thereby allowing a notification that the return of the communication charge has been completed to be displayed on the display 31 to allow the user to know the notification (Step S311).

Back to the conditional branches in Step S303, the list display unit 20 confirms whether or not the mail is the one extracted by the detection unit 16. If the mail is determined to be the one which has not been extracted, then the mail is outputted to the mail display unit 21. The contents of this mail are displayed by the mail display unit 21 on the display 31 (Step S312). Then, the user views the contents of the mail displayed on the display 31 and determines that this mail has not been extracted by the detection unit 16 but should have been extracted and the user determines whether the mail should be notified to the new pattern receiving server 60 or not (Step S313). In this processing, when the user does not select the notification to the new pattern receiving server 60, then processing is finished. On the other hand, when the user selects the notification to the new pattern receiving server 60 then the mail is sent from the undetected mail notification processing unit 23 to the new pattern receiving server 60 (Step S314).

Figure 16:
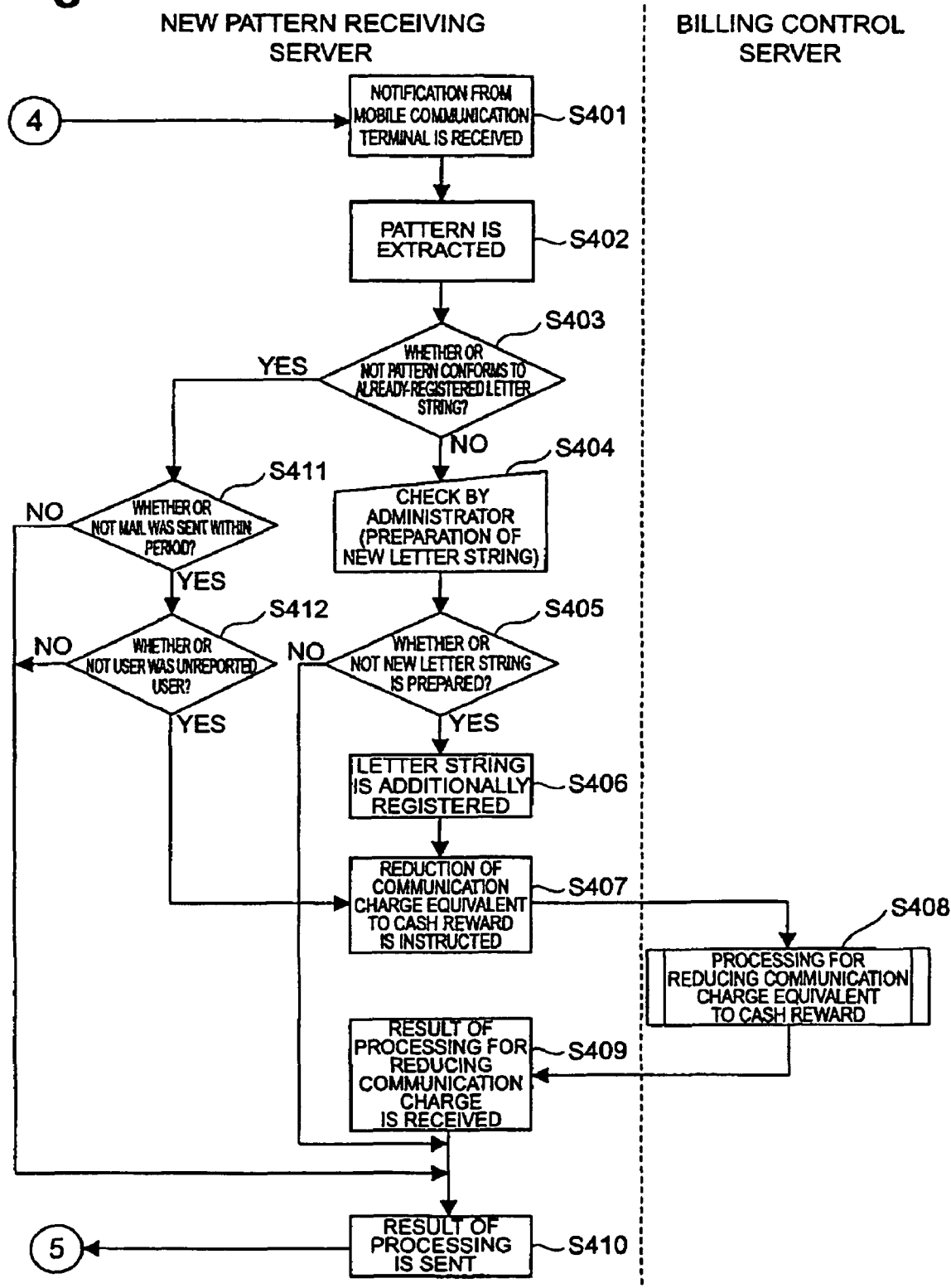
FIG. 16 is a flowchart of a method for detecting mail according to an embodiment.

Then, as shown in FIG. 16, the undetected mail notification receiving unit 61 of the new pattern receiving server 60 receives a mail sent from the undetected mail notification processing unit 23 of the mobile communication terminal 10 and outputs the mail to the detection conditions checking unit 62 (Step S401). Then, the detection conditions checking unit 62 extracts from the above outputted mail a candidate of a letter string (pattern) to be newly included in the detection condition data (Step S402). The detection conditions checking unit 62 determines whether or not the pattern extracted in such a manner conforms to letter strings included in all the detection condition data stored in the detection conditions storage unit 51 of the detection conditions distribution server 50 (Step 403). In this processing, when the detection conditions checking unit 62 confirms that the pattern is not yet registered in the detection conditions distribution server 50, then the detection conditions checking unit 62 outputs this pattern to the administrator checking unit 63. Then, the administrator of the new pattern receiving server 60 checks whether or not the pattern is a letter string to be newly registered and included in the detection condition data and, when the administrator of the new pattern receiving server 60 determines that the pattern is a letter string to be newly registered and included in the detection condition data, then the administrator checking unit 63 enables the pattern to be a letter string to be newly included in the detection condition data (Step S404). Then, the administrator checking unit 63 determines whether or not a new letter string is prepared (Step S405) and, when a new letter string is prepared, then the administrator checking unit 63 outputs this new letter string to the new detection conditions transmission unit 65 and the new detection conditions transmission unit 65 sends this new letter string to the detection conditions distribution server 50 (Step S406). This allows detection condition data including the new letter strings to be registered in the detection conditions distribution server 50. Next, the cash reward request unit 66 instructs, in order to send a cash reward to a user of the mobile communication terminal 10 which has provided a mail for newly preparing the detection condition data, the billing control server 80 to perform a processing for deducting the communication charge equivalent to this cash reward from the communication charge to the user (Step S407). Then, the billing control server 80 performs the processing for deducting the communication charge to send the processing result to the new pattern receiving server 60 (Step S408). This processing result is received by the cash reward request unit 66 of the new pattern receiving server 60 (Step S409). The check result transmission unit 64 sends a notification that the cash reward has been paid and a notification that the detection condition data including the new letter string has been registered in the mobile communication terminal 10 which has sent a mail contributed to the preparation of this new detection condition data (Step S410). On the other hand, the administrator checking unit 63 confirms whether or not a new letter string is prepared (Step S405) and, when such a new letter string is not prepared, then the administrator checking unit 63 sends a notification that a new letter string has not been prepared to the mobile communication terminal 10 which has sent the mail (Step S410).

Back to the conditional branches at Step S403, the detection conditions checking unit 62 determines whether or not the pattern detected from the mail conforms to a letter string included in any of the detection condition data stored in the detection conditions storage unit 51 of the detection conditions distribution server 50. If the detection conditions checking unit 62 determines that the pattern detected from the mail conforms to an already-registered letter string, then the detection conditions checking unit 62 compares the registration date of the already-registered letter string with a date at which the mail was sent and determines whether the mail was sent within the predetermined period (Step S411). Then, if the mail was sent within the predetermined period, then a determination is made as to whether a user of the mobile communication terminal 10 which has sent the mail is an unreported user (Step S412) and, when a user of the mobile communication terminal 10 who has sent the mail is an unreported user, then the cash reward request unit 66 instructs, in order to give a predetermined value of cash reward, the billing control server 80 to perform a processing for deducting the communication charge equivalent to the cash reward (Step S407). On the other hand, at the conditional branches in Step S411, when the date on which the mail was sent was out of the predetermined period or in the conditional branches in Step S412, when a user of the mobile communication terminal 10 who has sent the mail is an already-reported user, then a notification that detection condition data including a new letter string was not prepared and a notification that cash reward is not paid are sent to the mobile communication terminal 10 of the user (Step S410). The reason why the date at which the already-registered letter string was registered is compared with the date at which the mail was sent is to check whether or not the mail was sent within the predetermined period and whether the user sent the mail is an unreported user is that it is expected that simply prohibiting the provision of cash reward in the case of a letter string conforming to a already-registered letter string discourages the users of the mobile communication terminal 10 from providing more new letter strings. The reason why a check is provided as to whether the user is an unreported user or not is not to repeatedly give a single user a cash reward when the user reports a letter string two times or more.

Back to FIG. 15, the processing result sent from the new pattern receiving server 60 is received by the undetected mail notification processing unit 23 of the mobile communication terminal 10 (Step S315). The processing result is displayed on the display 31 to enable a user know the result (Step 316).

Hereinafter, operations and effects of the mail detection system 1, the mobile communication terminal 10, the detection conditions distribution server 50, the new pattern receiving server 60, and the detected mail notification receiving server will be described according to the present embodiment. First, the detection conditions acquisition unit 12 of the mobile communication terminal 10 downloads from the detection conditions distribution server 50 the detection condition data including a letter string and stores the detection condition data in the detection conditions storage unit 15. This "letter string" is a keyword for extracting a particular word from the title, sender address, body text or the like included in the mail. When the mail received by the mail receiving unit 11 includes the letter string, then the detection unit 16 performs a detection processing for extracting the mail. As described above the mail detection processing can be performed by use of a letter string controlled by the detection conditions distribution server 50. Therefore, the user of the mobile communication terminal 10 need not individually specify a letter string for extracting a specific mail, thereby increasing the convenience. Note that the detection condition data may include a plurality of letter strings. In this case, the detection unit 16 extracts a plurality of mails including letter strings respectively conforming to a plurality of letter strings included in this detection condition data. Thus, by detecting a mail by a plurality of letter strings as described above, the accuracy of the detection processing can be improved. Specifically, if a mail is extracted by use of one letter string, other mails that are not required to be extracted may also be detected. However, by the use of a plurality of letter strings such cases can be reduced.

The detection conditions customize unit 13 additionally registers the detection condition data inputted by a user in the detection conditions storage unit 15. Then, the detection unit 16 uses such additionally-registered detection condition data to perform detection processing. Thus, detection condition data can be additionally added so that a mail which is required to be detected by an individual user can be detected.

The list display unit 20 displays the list of pieces of information for identifying each of a plurality of mails received by the mail receiving unit 11 (e.g., mail title or sender address). When information identifying a mail extracted by the detection unit 16 is displayed by the list display unit 20, together with pieces of the information representing the category of a letter string included in the detection condition data conforming to a letter string included in the mail. This allows a user of the mobile communication terminal 10 to easily recognize, among those displayed in the list, the mail extracted by the detection unit 16 as well as to know the category of the letter string conforming to a letter string included in the detected mail. Note that in the present embodiment, a case where a number representing the category of a letter string included in the detection condition data being displayed on the side of a mail title in the list display is shown. However, information for identifying mails detected by the detection unit 16 may be displayed by a color different from the one of mails not detected by the detection unit 16 and the manner for displaying the list is not limited to the one illustrated in the embodiment.

When acquiring detection condition data, the detection conditions acquisition unit 12 sends category information inputted by a user to the detection conditions distribution server 50. Then, the detection conditions distribution server 50 sends to the mobile communication terminal 10 the detection condition data including category information to be sent. This allows the mobile communication terminal 10 to select the category of a letter string and to acquire the detection condition data. Note that the detection conditions acquisition unit 12 also may acquire all detection condition data from the detection conditions distribution server 50 and then select only required pieces of data to apply the data to the detection processing by the detection unit 16.

When the detection unit 16 included in the mobile communication terminal 10 extracts a mail conforming to a letter string included in the detection condition data, then information regarding the distribution processing of the detected mail regarding whether the mails is processed by the detected mail deletion unit 18 or by the detected mail selection deletion unit 19 is set, depending on input by the administrator of the mobile communication terminal 10, by the detection conditions control unit 53 included in the detection conditions distribution server 50 for each of the mobile communication terminal 10. Then, the detection conditions control unit 14 included in the mobile communication terminal 10 acquires the information regarding the distribution processing controlled to the mobile communication terminal 10 from the detection conditions control unit 53. When a mail is extracted by the detection processing based on the information regarding the distribution processing, the detection unit 16 distributes the processing of the mail to the detected mail deletion unit 18 or to the detected mail selection deletion unit 19. This allows a parent who is the administrator of the child, for example, to register a setting in the detection conditions distribution server 50 that specifies a mail conforming to a letter string included in the detection condition data as the one to be automatically deleted or enables the child to accept the selection to delete the mail when the mobile communication terminal 10 is used by a child. This setting regarding the distribution processing information can be provided to each category. As a result, when the mobile communication terminal 10 is used by a child, for example, a setting in which mails conforming to a letter string included in the category of "advertisement" shows a display that prompts the selection of deletion and a setting in which mails conforming to a letter string included in the category of "adult" can be automatically deleted can be registered in the detection condition distribution server 50. Thus, the mobile communication terminal 10 which acquires the registered settings can be controlled. Note that the information regarding the distribution processing of the detected mail for specifying that the mail extracted by the detection unit 16 is processed by the detected mail deletion unit 18 or by the detected mail selection deletion unit 19 also may be controlled by the detection conditions control unit 14 of the mobile communication terminal 10 based on the specification by the administrator of the mobile communication terminal 10 (corresponding to the first detected mail processing control means). In this case, the administrator of the mobile communication terminal 10 also may specify this distribution processing information for each category.

When the detected mail selection deletion unit 19 performs the display for prompting a user to select whether or not to delete the mail extracted by the detection unit 16, the information representing the category of a letter string included in the detection condition data conforming to a letter string included in the mail is displayed. Thus the user knows by which category of the letter string the mail was extracted when selecting whether or not to delete the mail detected by the detection unit 16. This display may be provided in a manner in which the category of a letter string included in the detection condition data conforming to the letter string included in the mail can be displayed. The manner in which the display is provided is not limited to the one shown in this embodiment. For example, the color displayed on a screen may be changed for each category.

The detection conditions control unit 53 included in the detection conditions distribution server 50 determines, with regards to the letter string included in the detection condition data acquired by the detection conditions acquisition unit 12 included in the mobile communication terminal 10, if application of the letter string to the detection condition data is indispensable or can be selected according to selection by the administrator of the mobile communication terminal 10. This specification is set based on the selection by the administrator and for each mobile communication terminal 10. Then, the detection conditions control unit 14 included in the mobile communication terminal 10 acquires the information for the application of detection conditions specified for the mobile communication terminal 10 from the detection conditions control unit 53. Then, the detection unit 16 included in the mobile communication terminal 10 determines, based on the information for the application of detection conditions, whether the application of the letter string is required or not, thereby performing the above-described detection processing. As a result, a parent who is the administrator of a child can register a setting in the detection conditions distribution server 50 by which the detection processing by the mobile communication terminal 10 used by a child in a manner that the application of the letter string in the detection processing is made indispensable or that the child accepts the selection of the application. In addition, the information for the application of detection conditions also can be set for each category. As a result, as for the mobile communication terminal 1 oused by a child, in the case of a letter string included in "advertisement", the parent allows the child to select whether or not to apply the letter string to the mail detection or the parent can set the application of a letter string to the mail detection to be indispensable for the letter string included in the category of "adult", and can register the setting in the detection condition distribution server 50, for example. Note that the detection conditions control unit 14 included in the mobile communication terminal 10 also may control, based on the specification by a user, this information for the application of detection conditions (which corresponds to the first detection conditions application control means).

Furthermore, the detected mail notification processing unit 22 included in the mobile communication terminal 10 sends the information regarding the mails detected by the detection unit 16 to the detected mail notification receiving server 70. This information regarding the mails includes, for example, the communication amount of a mail or the number of mails. Then, the detected mail receiving unit 71 in the detected mail notification receiving server 70 receives the information regarding the mail. Based on this information regarding the mail, the return instruction unit 72 sends instruction information to perform the processing for reducing the communication charge to the mail to the billing control server 80. As a result, the communication charge for the extracted mail can be returned. An example of this return will be described more specifically. When an unsolicited mail or the like is extracted by the detection unit 16 of the mobile communication terminal 10, then the detected mail notification processing unit 22 sends the information regarding the unsolicited mail, to the detected mail notification receiving server 70 thereby allowing the billing control server 80 to return the reception charge for the unsolicited mail. Note that instead of the above-mentioned return of the communication charge by the reduction of the communication charge, a reward such as a reward by a point or a coupon, by which the communication through the mobile communication terminal 10 can be provided free of charge, to the user of the mobile communication terminal 10 may be given.

Furthermore, the detected mail notification processing unit 22 sends the information regarding a mail to the detected mail notification receiving server 70 in the case that the user deletes the mail extracted by the detection unit 16 without viewing. This prevents the billing control server 80 from returning the communication charge when the user views a mail in spite of the fact that the mail has been extracted by the detection unit 16.

In addition, the detected mail notification processing unit 22 accumulates the mails extracted by the detection unit 16 until the mails reach the predetermined level before sending the mails to the detected mail notification receiving server 70. This "predetermined level" represents a case in which a fixed period of time has passed or the mails extracted by the detection unit 16 have reached a fixed amount. This eliminates the need for sending the information of a mail whenever the mail is extracted by the detection unit 16. Thus, the communication traffic can be reduces and the communication charge paid by a user can also be reduced.

Also, when information regarding a mail extracted by the detection unit 16 is sent from the detected mail notification processing unit 22 to the detected mail notification receiving server 70, communication charge to be returned from the billing control server 80 is calculated and the amount of the communication charge to be returned is displayed. As a result, a user can previously know the amount of the communication charge to be returned.

When a user of the mobile communication terminal 10 determines that a mail as the one which should have been extracted although the mail has not been extracted by the detection unit 16 and selects to send the mail to the new pattern receiving server 60, then the undetected mail notification processing unit 23 sends the mail to the new pattern receiving server 60. As a result, when a letter string to be newly included in the detection condition data is extracted in the new pattern receiving server 60, then the detection condition data including the new letter string is registered in the detection conditions distribution server 50. Thus, the detection conditions distribution server 50 can collect the letter strings for detecting a mail such as an unsolicited mail whose content is always changing, for example. In addition, the mobile communication terminal 10 which has provided a mail for detecting a new letter string as described above is provided with a benefit of reduction of the communication charge. This is because a value equivalent to a cash reward is deducted from the communication charge to the user of the mobile communication terminal 10 controlled by the billing control server 80. This encourages the user of the mobile communication terminal 10 to provide more mails for detecting new letter strings. Note that this cash reward provision is not limited to the reduction of a communication charge and also may be substituted by the reward such as a reward by a point or a coupon to the user of the mobile communication terminal 10 by which the communication through the mobile communication terminal 10 can be provided free of charge.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mobile communication terminal, comprising:
   mail receiving means for receiving mail from a mail server;
   detection conditions acquisition means for acquiring detection conditions data including a letter string from a detection conditions distribution server and storing the detection condition data in a detection conditions storage means;
   detection means for performing detection processing for extracting the mail received by the mail receiving means when a condition, in which the mail includes a letter string conforming to the letter string included in the detection condition data stored in the detection conditions storage means, is satisfied;
   a mail storage unit configured to store information indicating whether the mail has been extracted by the detection means and detection result information indicating a category of content of the mail that has been extracted; and
   detected mail notification processing means for sending information that the mail has been extracted by the detection means and the detection result information indicating the category of content of the mail that has been extracted to a detected mail notification receiving server,
   wherein the detection conditions acquisition means sends category information input at a user interface of the mobile communication terminal to the detection conditions distribution server, and acquires detection condition data including a letter string relevant to the category indicated by the category information sent by the detection conditions distribution server.

2. The mobile communication terminal according to claim 1,
   wherein the detection condition data includes a plurality of the letter strings, and
   when a condition in which the mail received by the mail receiving means includes the plurality of letter strings conforming to each of the plurality of the letter strings included in the detection condition data is satisfied, the detection means extracts the mail in the detection processing.

3. The mobile communication terminal according to claim 1, further comprising list display means for displaying a list of information for identifying a plurality of mail received by the mail receiving means, respectively,
   in the list displaying, the list display means displays information for identifying the mail extracted by the detection means in a mode different that of mail not extracted by the detection means.

4. The mobile communication terminal according to claim 1, further comprising detection conditions selection control means for storing selection information, which regards whether the letter string included in the detection condition data acquired by the detection conditions acquisition means is applied to the detection processing or not, corresponding to the letter string based on selection by a user,
   wherein the detection means applies the letter string to the detection processing when the application of the letter string to the detection processing is selected, based on the selection information corresponding to the letter string included in the detection condition data.

5. The mobile communication terminal according to claim 1, further comprising detected mail deletion means for deleting the mail received by the mail receiving means when the mail is detected by the detection means.

6. The mobile communication terminal according to claim 1, further comprising detected mail selection deletion means for providing a display for prompting a user to select whether or not to delete the mail extracted by the detection means and for deleting the mail based on the selection by the user in response to the display.

7. The mobile communication terminal according to claim 1, further comprising:
   detected mail deletion means for deleting the mail received by the mail receiving means when the mail is extracted by the detection means;
   detected mail selection deletion means for providing a display for prompting a user to select whether or not to delete the mail extracted by the detection means and for deleting the mail based on the selection by the user in response to the display; and
   first detected mail processing control means for storing information regarding distribution processing as to whether the mail extracted by the detection means is processed by the detected mail deletion means or the detected mail selection deletion means, based on an input by an administrator to the mobile communication terminal,
   wherein:
      the detection means distributes the processing of the mail to the detected mail deletion means or the detected mail selection deletion means when the mail is extracted by the detection processing, based on the information regarding the distribution processing stored by the first detected mail processing control means;
      the detected mail deletion means deletes the mail when the mail is distributed by the detection means to the detected mail delete means; and
      the detected mail selection deletion means provides a display for prompting a user to select whether or not to delete the mail and deletes the mail based on the selection by the user in response to the display when the mail is distributed by the detection means to the detected mail selection delete means.

8. The mobile communication terminal according to claim 1, further comprising:
   detected mail deletion means for deleting the mail received by the mail receiving means when the mail is extracted by the detection means;
   detected mail selection deletion means for providing a display for prompting a user to select whether or not to delete the mail extracted by the detection means and for deleting the mail based on the selection by the user in response to the display; and
   detected mail processing information acquisition means for acquiring information regarding distribution processing as to whether the mail extracted by the detection means is processed by the detected mail deletion means or by the detected mail selection deletion means from the detection conditions distribution server,
   wherein:
      the detection means distributes the processing of the mail to the detected mail deletion means or the detected mail selection deletion means when the mail is extracted through the detection processing, based on the information regarding the distribution processing acquired by the detected mail processing information acquisition means;
      the detected mail deletion means deletes the mail when the mail is distributed by the detection means to the detected mail deletion means; and
      the detected mail selection deletion means provides a display for prompting a user to select whether or not to delete the mail and deletes the mail based on the selection by the user in response to the display when the mail is distributed by the detection means to the detected mail selection deletion means.

9. The mobile communication terminal according to claim 1, further comprising first detection conditions application control means for storing detection condition application information which regards whether application of the letter string included in the detection condition data acquired by the detection conditions acquisition means to the detection processing by the detection means is indispensable or the application can be selected by a user, based on the input to the mobile communication terminal by an administrator,
   wherein the detection means applies the letter string to the detection processing when the letter string included in the detection condition data is indispensable for the detection processing or when the application of the letter string included in the detection condition data to the detection processing can be freely selected and the user selects to allow the letter string to be applied to the detection processing, based on the detection condition application information stored by the first detection conditions application control means.

10. The mobile communication terminal according to claim 1, further comprising detection condition application information acquisition means for acquiring detection condition application information which regards whether application of the letter string, included in the detection condition data acquired by the detection conditions acquisition means, to the detection processing by the detection means is indispensable or the application can be selected by a user,
   wherein the detection means applies the letter string to the detection processing when the letter string is always applied to the detection processing or when the application of the letter string to the detection processing can be freely selected and the user selects to allow the letter string to be applied to the detection processing based on the detection condition application information acquired by the detection condition application information acquisition means.

11. A detection conditions distribution server for controlling detection condition data including a letter string for extracting specific mail received by a mobile communication terminal, comprising:
   detected mail processing control unit configured to store information regarding distribution processing for specifying that each of a plurality of mobile communication terminals automatically deletes mail or that a user is allowed to select the deletion, when the mail received by each of the plurality of mobile communication terminals which acquires the detection condition data satisfy the condition in which the mail include letter strings conforming to the letter string included in the detection condition data, based on specification by an administrator of each of the plurality of mobile communication terminals such that each piece of the information is associated with the information for identifying each of the mobile communication terminals; and an interface configured to receive information indicating whether a mail has been extracted by each of the plurality of mobile communication terminals and detection result information indicating a category of content of the mail that has been extracted and storing the information indicating whether a mail has been extracted and the detection result information at the detected mail processing control unity wherein the interface is further configured to receive a request from at least one of the plurality of mobile communication terminals including category information input at a user interface of the at least one of the plurality of mobile communication terminals, and transmit detection condition data including a letter string relevant to the category indicated by the category information in the request to the at least one of the plurality of mobile communication terminals.

12. A detected mail notification receiving server, comprising:

an interface configured to receive a request including category information input at a user interface of a mobile communication terminal, and transmit detection condition data including a letter string relevant to the category indicated by the category information in the request to the mobile communication terminal:

detected mail receiving unit configured to receive information regarding mail including a first letter string conforming to a second letter string for detecting specific mail which is sent by the mobile communication terminal;

an interface configured to receive information indicating whether a mail has been extracted by the mobile communication terminal and detection result information indicating a category of content of the mail that has been extracted; and communication charge return instruction unit configured to send instruction information for instructing billing control server to perform reduction processing of the communication charge for the mail to the billing control server, based on the information regarding the extracted mail received by the detected mail receiving unit.

13. A mobile communication terminal, comprising:

an interface configured to receive mail from a mail server;

detection conditions acquisition unit configured to acquire detection conditions data including a letter string from a detection conditions distribution server;

a memory configured to store the detection condition data;

a processor configured to extract the mail received by the interface when a condition, in which the mail includes a letter string conforming to the letter string included in the detection condition data, is satisfied;

a memory configured to store information indicating whether the mail has been extracted and detection result information indicating a category of content of the mail that has been extracted; and an interface configured to send information that the mail has been extracted and the detection result information indicating the category of content of the mail that has been extracted to a detected mail notification receiving servers, wherein the detection conditions acquisition unit is configured to send category information input at a user interface of the mobile communication terminal to the detection conditions distribution server, and acquire detection condition data including a letter string relevant to the category indicated by the category information sent by the detection conditions distribution server.

* * * * *